(12) United States Patent
Myung

(10) Patent No.: US 10,990,181 B2
(45) Date of Patent: Apr. 27, 2021

(54) DISPLAY DEVICE INCLUDING A VIBRATING ELEMENT

(71) Applicant: SAMSUNG DISPLAY CO., LTD., Yongin-si (KR)

(72) Inventor: Jung Ho Myung, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 16 days.

(21) Appl. No.: 16/453,008

(22) Filed: Jun. 26, 2019

(65) Prior Publication Data
US 2020/0081541 A1 Mar. 12, 2020

(30) Foreign Application Priority Data

Sep. 11, 2018 (KR) .................. 10-2018-0108159

(51) Int. Cl.
*G06F 3/01* (2006.01)
*G01L 1/18* (2006.01)
*G06F 3/041* (2006.01)

(52) U.S. Cl.
CPC .............. *G06F 3/016* (2013.01); *G01L 1/183* (2013.01); *G06F 3/0416* (2013.01)

(58) Field of Classification Search
CPC ......... G06F 3/016; G06F 3/0416; G01L 1/183
See application file for complete search history.

(56) References Cited

U.S. PATENT DOCUMENTS

| | | | |
|---|---|---|---|
| 8,686,952 B2 | 4/2014 | Burrough et al. | |
| 9,710,063 B2* | 7/2017 | Levesque | G06F 3/016 |
| 10,509,471 B2* | 12/2019 | Dabic | G06F 3/016 |
| 10,705,613 B2* | 7/2020 | Ham | H01L 41/0478 |
| 10,735,898 B2* | 8/2020 | Yang | G01S 19/25 |
| 2015/0116231 A1* | 4/2015 | Kim, II | G06F 3/016 345/173 |
| 2016/0018891 A1* | 1/2016 | Levesque | G06F 3/016 345/174 |
| 2017/0329406 A1* | 11/2017 | Dabic | G06F 3/016 |
| 2018/0164888 A1* | 6/2018 | Ham | G02F 1/13338 |

FOREIGN PATENT DOCUMENTS

| | | |
|---|---|---|
| CN | 103869523 | 6/2014 |
| KR | 10-2007-0045954 | 5/2007 |
| KR | 10-1383702 | 4/2014 |
| KR | 10-2015-0031641 | 3/2015 |
| KR | 10-1618665 | 4/2016 |

* cited by examiner

*Primary Examiner* — Peter D McLoone
(74) *Attorney, Agent, or Firm* — F. Chau & Associates, LLC

(57) ABSTRACT

A display device may include a display panel, a touch member disposed on the display panel and configured to sense a touch signal, a cover panel sheet disposed under the display panel and having an opening via which at least a part of the display panel is exposed, a first vibrating element disposed in the opening, a touch drive chip electrically connected to the touch member and configured to detect touch coordinates in response to the touch signal, a processor electrically connected to the touch drive chip and configured to receive the touch coordinates to generate a pattern signal corresponding to the touch coordinates, and a haptic drive chip electrically connected to the processor and configured to receive the pattern signal to control the first vibrating element. The first vibrating element may be operated differently for different periods of time.

20 Claims, 16 Drawing Sheets

DISPLAY DEVICE INCLUDING A VIBRATING ELEMENT

CROSS-REFERENCE TO RELATED APPLICATION

This application claims priority under 35 U.S.C. § 119 to Korean Patent Application No. 10-2018-0108159, filed on Sep. 11, 2018 in the Korean Intellectual Property Office, the disclosure of which is incorporated by reference herein in its entirety.

TECHNICAL FIELD

Exemplary embodiments of the inventive concept relate to a display device, and more particularly, to an organic light-emitting display device including a vibrating element.

DISCUSSION OF RELATED ART

Electronic devices that provide images to a user, such as a smartphone, a digital camera, a laptop computer, a navigation device, or a TV, include a display device for displaying images. A display device includes a display panel for generating and displaying images, and a cover panel sheet disposed under the display panel. The cover panel sheet may include various functional sheets for protecting the display panel from heat, external impact, or the like.

A display device may further include a vibrating element for creating vibration. A vibrating element is a device that converts electrical energy into mechanical vibration by utilizing electromagnetic force. Such a vibrating element may employ a piezoelectric haptic actuator using a piezoelectric element as a driving source. To do so, the converse piezoelectric effect, in which displacement occurs when a voltage is applied to the piezoelectric element, is utilized. As such, a vibration force is created by moving the weight of the mover with the displacement.

SUMMARY

According to an exemplary embodiment of the inventive concept, a display device may include a display panel, a touch member disposed on the display panel and configured to sense a touch signal, a cover panel sheet disposed under the display panel and having an opening via which at least a part of the display panel is exposed, a first vibrating element disposed in the opening, a touch drive chip electrically connected to the touch member and configured to detect touch coordinates in response to the touch signal, a processor electrically connected to the touch drive chip and configured to receive the touch coordinates to generate a pattern signal corresponding to the touch coordinates, and a haptic drive chip electrically connected to the processor and configured to receive the pattern signal to control the first vibrating element. The first vibrating element may be operated differently for different periods of time.

According to an exemplary embodiment of the inventive concept, a display device may include a display panel, a touch member disposed on the display panel and configured to sense a touch signal, a cover panel sheet disposed under the display panel and having a trench that is concave toward the display panel, a first vibrating element disposed in the trench, a touch drive chip electrically connected to the touch member and configured to detect touch coordinates in response to the touch signal, a processor electrically connected to the touch drive chip and configured to receive the touch coordinates to generate a pattern signal corresponding to the touch coordinates, and a haptic drive chip electrically connected to the processor and configured to receive the pattern signal to control the first vibrating element. The first vibrating element may be operated differently for different periods of time.

According to an exemplary embodiment of the inventive concept, a display device may include a display panel, a touch member disposed on the display panel and configured to sense a touch signal, a cover panel sheet disposed under the display panel, a bracket configured to accommodate the display panel, the touch member, and the cover panel sheet, a vibrating element disposed in contact with the bracket, a touch drive chip electrically connected to the touch member and configured to detect touch coordinates in response to the touch signal, a processor electrically connected to the touch drive chip and configured to receive the touch coordinates to generate a pattern signal corresponding to the touch coordinates, and a haptic drive chip electrically connected to the processor and configured to receive the pattern signal to control the vibrating element. The vibrating element may be operated differently for different periods of time.

BRIEF DESCRIPTION OF THE DRAWINGS

The above and other aspects and features of the inventive concept will become more apparent by describing in detail exemplary embodiments thereof with reference to the attached drawings.

DETAILED DESCRIPTION OF THE EMBODIMENTS

Figure 1:
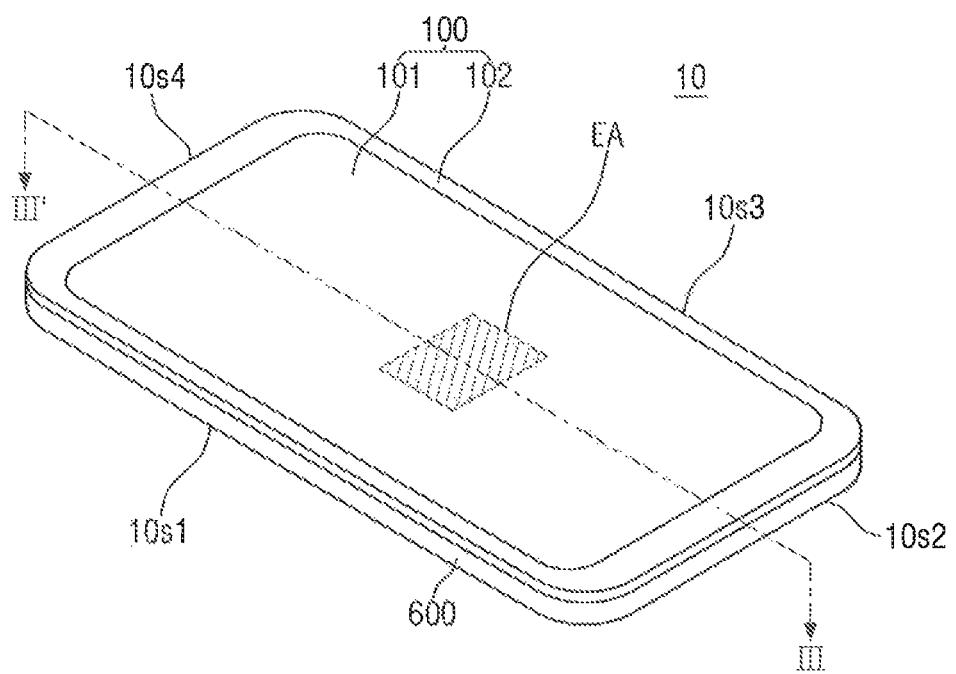
FIG. 1 is a perspective view of a display device according to an exemplary embodiment of the inventive concept.

Exemplary embodiments of the inventive concept will be described more fully hereinafter with reference to the accompanying drawings. Like reference numerals may refer to like elements throughout this application.

It will be understood that when an element or layer is referred to as being "on", "connected to", or "coupled to" another element or layer, it can be directly on, connected, or coupled to the other element or layer, or intervening elements or layers may be present. In contrast, when an element is referred to as being "directly on", "directly connected to", or "directly coupled to" another element or layer, there are no intervening elements or layers present.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

In the drawings, components may be exaggerated or reduced in size for convenience of explanation.

Figure 2:
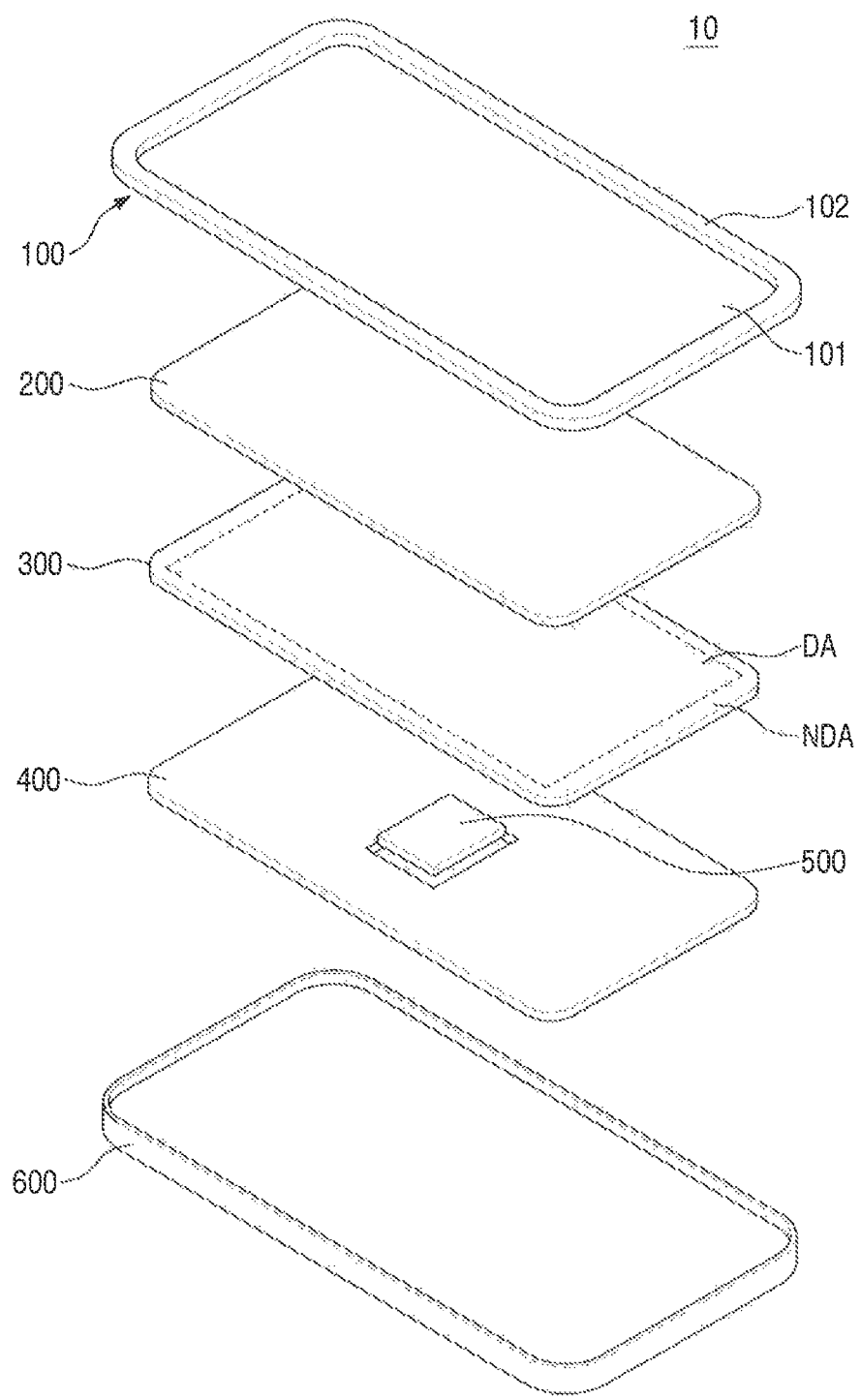
FIG. 2 is an exploded perspective view of the display device shown in FIG. 1 according to an exemplary embodiment of the inventive concept.
Figure 3:
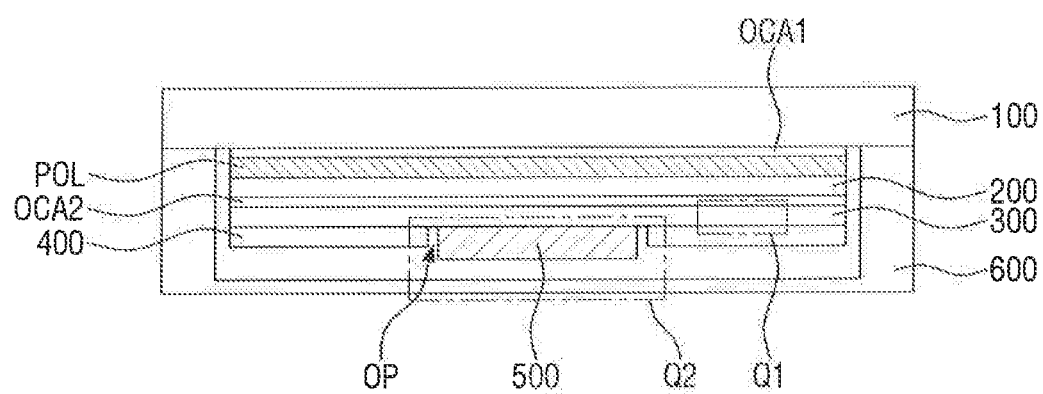
FIG. 3 is a cross-sectional view taken along line III-III' of FIG. 1 according to an exemplary embodiment of the inventive concept.

FIG. 1 is a perspective view of a display device according to an exemplary embodiment of the inventive concept. FIG. 2 is an exploded perspective view of the display device shown in FIG. 1 according to an exemplary embodiment of the inventive concept. FIG. 3 is a cross-sectional view taken along line III-III' of FIG. 1 according to an exemplary embodiment of the inventive concept.

A display device is an output device for presentation of data in the form of image or video. For example, display devices may find applications in a smartphone, a tablet PC, a personal digital assistant (PDA), a portable multimedia player (PMP), a game device, a wearable electronic device such as a wristwatch, a personal computer, a laptop computer, a navigation device for vehicles, a digital camera, a television, etc.

Referring to FIGS. 1 to 3, a display device 10 includes a display panel 300, a cover panel sheet 400 disposed under the display panel 300, and a vibrating element 500. The display device 10 may further include a touch member 200 disposed on the display panel 300 and a window 100 disposed on the touch member 200. In addition, the display device 10 may further include a bracket 600 disposed under the cover panel sheet 400 and the vibrating element 500. The touch member 200, the display panel 300, the cover panel sheet 400, and the vibrating element 500 may be surrounded by the window 100 thereabove and the bracket 600 therebelow.

The display device 10 may include an element area EA where the vibrating element 500 is disposed, which will be described in detail below. In other words, the element area EA may overlap with the vibrating element 500. Although only one element area EA is shown in the drawings, more than one element areas EA may be formed in exemplary embodiments of the inventive concept. When the display device 10 includes one element area EA, the element area EA may be formed at the center of the display device 10. It is, however, to be understood that the inventive concept is not limited thereto. The element area EA may be formed adjacent to a shorter side 10s2 and 10s4 of the display device 10. When the display device 10 includes a plurality of element areas EA, the element areas EA may be, but are not limited to being, formed symmetrically with respect to the center line of the display device 10.

The window 100 is disposed above the display panel 300 to protect the display panel 300 and transmits the light exiting from the display panel 300. The window 100 may be made of glass, sapphire, plastic, etc. Although the window 100 is rigid, it may also be flexible. When a user touches the display device 10, the window 100 may be the part that comes in contact with the user's body.

The window 100 may be disposed to overlap the display panel 300 and cover the front surface of the display panel 300. The window 100 may be larger than the display panel 300. For example, the side surfaces of the display panel 300 may be positioned more to the inside than the side surfaces of the window at side surfaces 10s1, 10s2, 10s3, and 10s4 of the display device 10 (where the side surfaces 10s1 and 10s3 may be the longer sides of the display device 10).

The window 100 may include a light-blocking portion 102 disposed at the edges thereof. The light-blocking portion 102 overlaps with the non-display area of the display panel 300, thus preventing the non-display area from being seen by a user. A transparent portion 101 of the window 100 may overlap the display area DA of the display panel 300 and may transmit light emitted from the display area DA.

The touch member 200 may be disposed under the window 100. The touch member 200 may be of a rigid panel type, a flexible panel type, or a film type. The touch member 200 may have substantially the same size as the display panel 300 and may overlap it. The sides of the touch member 200 may be aligned with the sides of the display panel 300, as an example. In exemplary embodiments of the inventive concept, the touch member 200 may be included inside the display panel 300.

A polarizing layer POL may be disposed between the window 100 and the touch member 200. In an exemplary embodiment of the inventive concept, the polarizing layer POL may be a reflective polarizing layer. When the first polarizing layer 120 is a reflective polarizing layer, it may include a wire grid pattern and may transmit polarization components in parallel with the transmission axis while reflecting polarization components in parallel with the reflection axis. Examples of the wire grid pattern may include a metal material such as aluminum (Al), silver (Ag), gold (Au), copper (Cu), titanium (Ti), molybdenum (Mo), nickel (Ni), or an alloy thereof.

The polarizing layer POL may be coupled with one surface of the window 100 by a separate adhesive member OCA1. The adhesive member OCA1 may be, for example, a pressure-sensitive adhesive or an optically clear adhesive. In other implementations, the polarizing layer POL may be in contact with the window 100. For example, the polarizing layer POL may be formed on a surface of the window 100 via a continuous process.

The display panel 300 is a panel where images are displayed. For example, an organic light-emitting display panel may be employed. In the following description, the organic light-emitting display panel including self-luminous elements is employed as the display panel 300. It is, however, to be understood that other types of display panels such as a liquid-crystal display panel, an electrophoretic display panel, or a plasma display panel may also be employed.

The display panel 300 includes a plurality of organic light-emitting diodes arranged on a base substrate. The constituent elements of the display panel 300 will be described below with reference to FIG. 4.

The base substrate may be a rigid substrate made of glass or the like, or a flexible substrate made of polyimide or the like. When a polyimide substrate is used as the base substrate, the display panel 300 may be curved, bent, folded, or rolled.

The display panel 300 may include a display area DA and a non-display area NDA disposed around the display area DA. The display area DA displays images thereon and overlaps with the transparent portion 101 of the window 100. The non-display area NDA does not display images, is adjacent to the display area DA, and overlaps with the light-blocking portion 102 of the window 100. The non-display area NDA may be adjacent to and surround the display area DA when viewed from the top.

The display panel 300 may be coupled to a surface of the touch member 200 by a separate adhesive member OCA2. The adhesive member OCA2 may be, for example, a pressure-sensitive adhesive or an optically clear adhesive. It is, however, to be understood that the inventive concept is not limited thereto. The touch member 200 may be in contact with the display panel 300 and may be formed via a continuous process.

The cover panel sheet 400 and the vibrating element 500 may be disposed under the display panel 300. The cover panel sheet 400 and the vibrating element 500 may be disposed between the display panel 300 and the bracket 600. Although the vibrating element 500 may be attached directly under the display panel 300, this is merely illustrative. In exemplary embodiments of the inventive concept, the vibrating element 500 may be attached directly on the bracket 600.

The cover panel sheet 400 may have substantially the same size as the display panel 300 and may overlap it. The sides of the cover panel sheet 400 may be aligned with the sides of the display panel 300, for example. The cover panel sheet 400 may be disposed under the display panel 300 and may perform a heat-dissipating function, electromagnetic wave shielding function, pattern hiding function, grounding function, buffering function, strength enhancing function, and/or digitizing function. The cover panel sheet 400 may include a functional layer having at least one of the above-described functions. The functional layer may be provided in a variety of forms such as a layer, a film, a sheet, a plate, or a panel. The vibrating element 500 may generate vibration in response to a pattern signal to be described below. The pattern signal may include amplitude and frequency signals. In an exemplary embodiment of the inventive concept, the vibrating element 500 may include a piezoelectric element including a vibration material layer.

The vibrating element 500 may be disposed at the center of the display device 10. For example, the vibrating element 500 may be disposed such that it overlaps with the transparent portion 101 of the window 100. It is to be noted that the position of the vibrating element 500 is not limited thereto. In an exemplary embodiment of the inventive concept, the vibrating element 500 may be disposed adjacent to one side of the display device 10. When the vibrating element 500 is disposed adjacent to one side of the display device 10, the vibrating element 500 is disposed at the boundary between the display area DA and the non-display area NDA of the display panel 300 when viewed from the top. A part of the vibrating element 500 may overlap with the non-display area NDA while the other part may overlap with the display area DA. It is, however, to be understood that the inventive concept is not limited thereto. The vibrating element 500 may be disposed such that it entirely overlaps with the non-display area NDA or the display area DA. The area where the vibrating element 500 is disposed may be the element area EA. The vibrating element 500 may overlap the element area EA in the vertical direction with respect to the window 100.

The vibrating element 500 may be disposed inside the cover panel sheet 400. In an exemplary embodiment of the inventive concept, the cover panel sheet 400 may include an opening OP, in which the vibrating element 500 may be disposed.

The vibrating element 500 may come in contact with the display panel 300 by a separate adhesive member. In other implementations, other layers or members may be interposed between the vibrating element 500 and the display panel 300. For example, a light-absorbing member may be interposed between the vibrating element 500 and the display panel 300.

Although the display device 10 includes the single vibrating element 500 in the drawings, this is merely illustrative. In other implementations, the display device 10 may include a plurality of vibrating elements 500. When the display device 10 includes a plurality of vibrating elements 500, each of the vibrating elements may generate vibration individually.

As described above, the vibrating element 500 may be attached directly to the display panel 300 through the opening OP of the cover panel sheet 400. When the vibrating element 500 is utilized as an element for generating sound, the display device may include a separate diaphragm for effectively delivering sound. When the display device includes a diaphragm, noise may be generated on the side transferring the vibration, and the vibration may not be transferred effectively.

In contrast, according to the present exemplary embodiment, no separate element such as a diaphragm is interposed between the display panel 300 and the vibrating element 500, and accordingly, the vibration generated in the vibrating element 500 can be effectively transferred to the display panel 300. For example, there is no concern that the vibration generated by the vibrating element 500 is not transferred effectively. Further, as the display device 10 does not include a separate diaphragm, there is no possibility of occurrence of noise. In addition, the vibrating element 500 can be attached directly to the display panel 300 without a diaphragm, so that the thickness of the display device 10 is not increased.

The bracket 600 may be disposed under the cover panel sheet 400 and the vibrating element 500. The bracket 600 accommodates the window 100, the touch member 200, the display panel 300, the cover panel sheet 400, and the vibrating element 500. The bracket 600 may include a bottom surface and side walls. The bottom face of the bracket 600 faces the lower surface of the cover panel sheet 400, and the side walls of the bracket 600 face the window 100, the touch member 200, the display panel 300 and the cover panel sheet 400. The outer surface of the bracket 600 may be aligned with the outer surface of the window 100. It is, however, to be understood that the inventive concept is not limited thereto. The side wall of the bracket 600 may surround the side surface of the window 100. The window 100 may be attached to the bracket 600 by a waterproof tape. In exemplary embodiments of the inventive concept of the inventive concept, the bracket 600 may be made of a synthetic resin material, a metal material, or a combination of different materials.

The display device 10 may further include a touch drive chip, a processor, and a haptic drive chip, which will be described later. The touch drive chip, the processor, and the haptic drive chip may be electrically connected to one another and may further include circuitry for electrical connection.

The touch drive chip may receive a touch signal from the touch member 200 and may detect touch coordinates. The processor may receive the touch coordinates from the touch drive chip and may generate a pattern signal corresponding to the touch coordinates. The pattern signal may be a control signal including frequency and amplitude signals. Further, the processor may transmit the generated pattern signal to the haptic drive chip. The haptic drive chip may control the vibrating element 500 of the display device 10 based on the pattern signal transmitted from the processor.

The touch drive chip, the processor, and the haptic drive chip may be disposed on the cover panel sheet 400, and the circuitry electrically connecting them may be patterned on the cover panel sheet 400. In exemplary embodiments of the inventive concept, the touch drive chip, the processor, and the haptic drive chip may be disposed on a separate printed circuit board. The printed circuit board may be disposed between the cover panel sheet 400 and the bracket 600 or on the outer side of the bracket 600.

Figure 4:
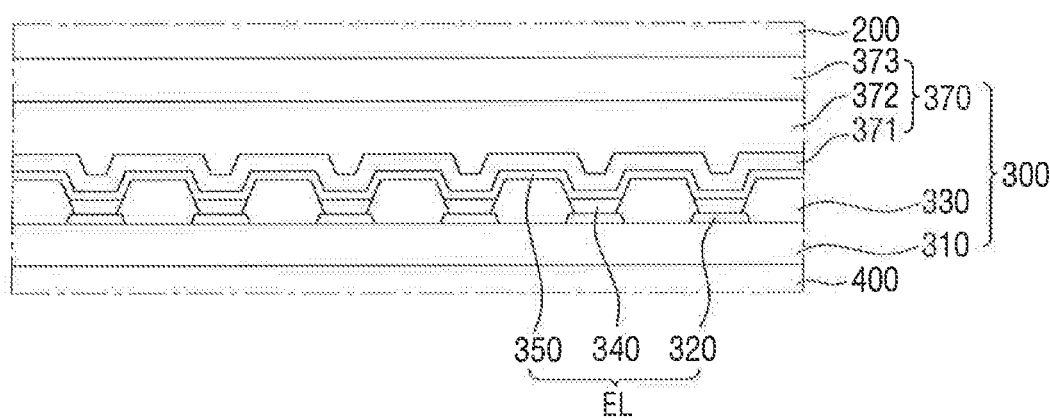
FIG. 4 is an enlarged cross-sectional view of a portion Q1 of FIG. 3 according to an exemplary embodiment of the inventive concept.

FIG. 4 is an enlarged cross-sectional view of a portion Q1 of FIG. 3.

Referring to FIG. 4, the display panel 300 may include a base substrate 310, a first electrode 320, a pixel-defining layer 330, an emission layer 340, a second electrode 350, and an encapsulation layer 370.

The base substrate 310 may be disposed on the cover panel sheet 400. The base substrate 310 may be an insulating substrate. In an exemplary embodiment of the inventive concept, the base substrate 310 may include a flexible polymer material. The polymer material may be polyethersulfone (PES), polyacrylate (PA), polyarylate (PAR), polyetherimide (PEI), polyethylenenapthalate (PEN), polyethyleneterepthalate (PET), polyphenylenesulfide (PPS), polyallylate, polyimide (PI), polycarbonate (PC), cellulosetriacetate (CAT), cellulose acetate propionate (CAP), or combinations thereof. The material of the base substrate 310 is not limited the above-listed materials. In other implementations, the base substrate 310 may be formed as a glass substrate containing an inorganic material.

The first electrode 320 may be disposed on the base substrate 310. In exemplary embodiments of the inventive concept, the first electrode 320 may be an anode electrode.

A plurality of elements may be further disposed between the base substrate 310 and the first electrode 320. For example, the elements may include a buffer layer, a plurality of conductive wirings, an insulating layer, a plurality of thin-film transistors, etc.

The pixel-defining layer 330 may be disposed on the first electrode 320. The pixel-defining layer 330 includes openings each exposing at least a part of the respective first electrodes 320.

The emission layer 340 may be disposed on the first electrode 320.

In exemplary embodiments of the inventive concept, the emission layer 340 may emit one of red light, green light, and blue light. The wavelength of the red light may range from approximately 620 to 750 nm, and the wavelength of the green light may range from approximately 495 to 570 nm. Further, the wavelength of the blue light may range from approximately 450 to 495 nm.

Alternatively, according to an exemplary embodiment of the inventive concept, the emission layer 340 may emit white light. When the emission layer 340 emits white light, the emission layer 340 may have a stack structure of a red emission layer, a green emission layer, and a blue emission layer. In addition, additional color filters for displaying red, green, and blue colors, respectively, may be further included.

In exemplary embodiments of the inventive concept, the emission layer 340 may be an organic emission layer. Alternatively, according to an exemplary embodiment of the inventive concept, the emission layer 340 may be a quantum-dot emission layer.

The second electrode 350 may be disposed on the emission layer 340 and the pixel-defining layer 330. For example, the second electrode 350 may be disposed entirely on the emission layer 340 and the pixel-defining layer 330. In exemplary embodiments of the inventive concept, the second electrode 350 may be a cathode electrode.

The first electrode 320, the second electrode 350, and the emission layer 340 may form a self-luminous element EL.

The encapsulation layer 370 may be disposed on the self-luminous element EL. The encapsulation layer 370 can seal the self-luminous element EL and prevent moisture or the like from permeating into the self-luminous element EL from the outside.

In exemplary embodiments of the inventive concept, the encapsulation layer 370 may be formed of a thin-film encapsulation and may include one or more organic films and one or more inorganic films. For example, the encapsulation layer 370 may include a first inorganic layer 371 disposed on the second electrode 350, an organic layer 372 disposed on the first inorganic layer 371, and a second inorganic layer 373 disposed on the organic layer 372.

The first inorganic layer 371 can prevent moisture, oxygen, and the like from permeating into the self-luminous element EL. The first inorganic layer 371 may be made of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON), etc.

The organic layer 372 may be disposed on the first inorganic layer 371. The organic layer 372 can improve the flatness. The organic layer 372 may be formed of a liquid organic material, and may be formed of an acrylic resin, a methacrylic resin, polyisoprene, a vinyl resin, an epoxy resin, a urethane resin, a cellulose resin, a perylene resin, etc. Such organic material may be provided on the base substrate 310 through deposition, printing, and coating, and may be subjected to a curing process.

The second inorganic layer 373 may be disposed on the organic layer 372. The second inorganic layer 373 may perform substantially the same or similar function as the first inorganic layer 371, and may be made of a material substantially the same as or similar to the first inorganic layer 371. The second inorganic layer 373 may completely cover the organic layer 372. In exemplary embodiments of the inventive concept, the second inorganic layer 373 and the first inorganic layer 371 may come in contact with each other in the non-display area NDA to form an inorganic-inorganic junction.

It is to be noted that the structure of the encapsulation layer 370 is not limited thereto but may vary depending on implementations. In some implementations, the encapsulation layer 370 may be formed of a glass substrate or the like.

In exemplary embodiments of the inventive concept, the touch member 200 may be disposed on the encapsulation layer 370.

Figure 5:
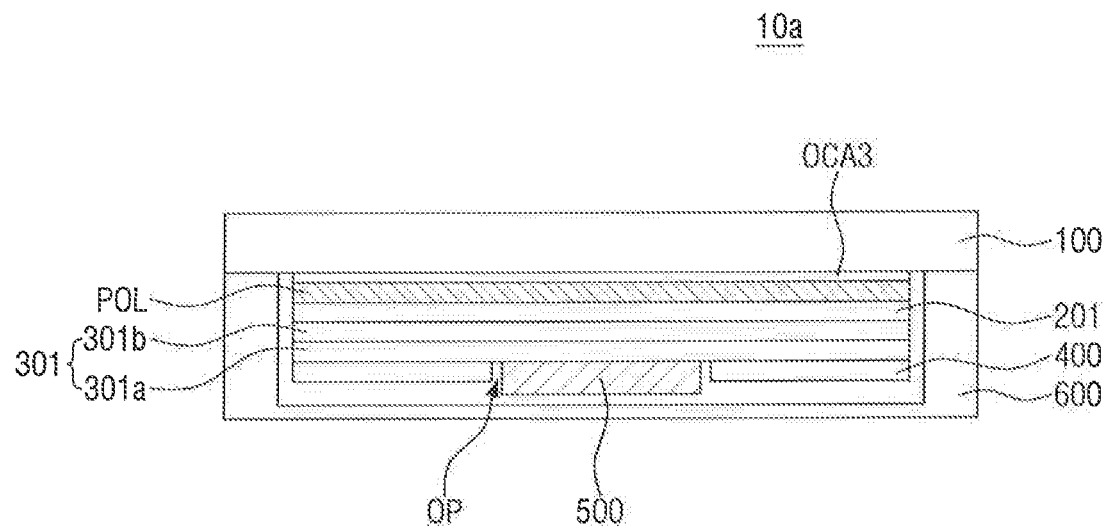
FIGS. 5 and 6 are cross-sectional views of display devices according to exemplary embodiments of the inventive concept.
Figure 6:
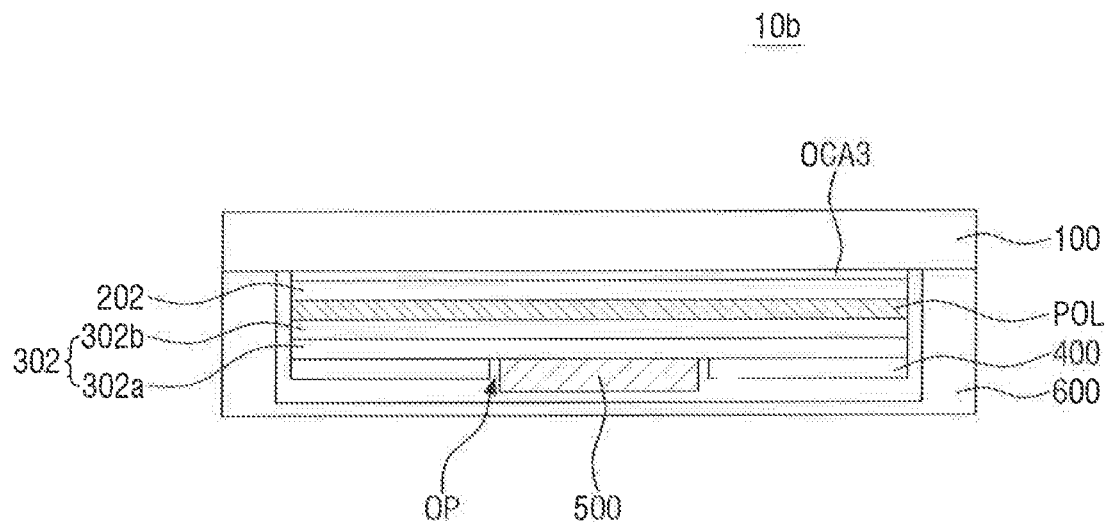

FIGS. 5 and 6 are cross-sectional views of display devices according to exemplary embodiments of the inventive concept.

The exemplary embodiments of FIGS. 5 and 6 are different from the exemplary embodiment of FIG. 3 in that a display panel includes a display substrate and an encapsulation substrate. In the following descriptions, descriptions will be made focusing on differences from the exemplary embodiment of FIG. 3.

Referring to FIG. 5, a display device 10a may include the window 100, the polarizing layer POL, a touch member 201, a display panel 301, the cover panel sheet 400, and the vibrating element 500.

At least a part of each of the polarizing layer POL, the touch member 201, the display panel 301, the cover panel sheet 400, and the vibrating element 500 may overlap with the window 100 in the vertical direction. The window 100 may protrude outward from both of the shorter sides of the display panel 301. The window 100 may be made of glass, sapphire, plastic, or the like. The window 100 may be, but is not limited to being, rigid.

The polarizing layer POL may be disposed under the window 100. The polarizing layer POL may include an absorptive polarizing layer or a reflective polarizing layer. In an exemplary embodiment of the inventive concept, the polarizing layer POL may be coupled with one surface of the window 100 by a separate adhesive member OCA3. The adhesive member OCA3 may be, for example, a pressure-sensitive adhesive or an optically clear adhesive.

The touch member 201 may be disposed under the polarizing layer POL.

The display panel 301 may include an encapsulation substrate 301b disposed on a display substrate 301a, instead of the encapsulation layer 370 in FIG. 4. In an exemplary embodiment of the inventive concept, the encapsulation substrate 301b may contain an inorganic material. For example, the encapsulation substrate 301b may be a glass substrate. The encapsulation substrate 301b seals the display panel 301 with the display substrate 301a and a sealing member, and can prevent moisture or the like from permeating into the self-luminous element from the outside.

The cover panel sheet 400 and the vibrating element 500 may be disposed under the display panel 301. The cover panel sheet 400 may include an opening via which a part of one surface of the display panel 301 is exposed. The vibrating element 500 may be disposed in the opening OP and in contact with the cover panel sheet 400.

The exemplary embodiment shown in FIG. 6 is different from the exemplary embodiment shown in FIG. 5 in that a touch member 202 is disposed between the window 100 and the polarizing layer POL.

Referring to FIG. 6, a display device 10b may include the window 100, the touch member 202, the polarizing layer POL, a display panel 302, the cover panel sheet 400, and the vibrating element 500.

The touch member 202 may be disposed between the window 100 and the polarizing layer POL. The touch member 202 may be formed separately from the window 100 and the polarizing layer POL and may be coupled to one surface of the window 100 by the separate adhesive member OCA3. It is, however, to be understood that the inventive concept is not limited thereto. The touch member 202 may be coupled to one surface of the polarizing layer POL by a separate adhesive member.

The polarizing layer POL may be disposed under the touch member 202. The polarizing layer POL may include an absorptive polarizing layer or a reflective polarizing layer. The polarizing layer POL may be coupled with one surface of the touch member 202 and/or the display panel 302 by a separate adhesive member.

The display panel 302 may include a display substrate 302a and an encapsulation substrate 302b disposed on the display substrate 302a. The display substrate 302a may include a base substrate made of an inorganic material such as glass and a light-emitting layer disposed on the base substrate.

In addition, the encapsulation substrate 302b may include an inorganic material. For example, the encapsulation substrate 302b may be a glass substrate. The encapsulation substrate 302b seals the display panel 302 with the display substrate 302a and a sealing member, and can prevent moisture or the like from permeating into the self-luminous element from the outside.

The cover panel sheet 400 and the vibrating element 500 may be disposed under the display panel 302.

Figure 7:
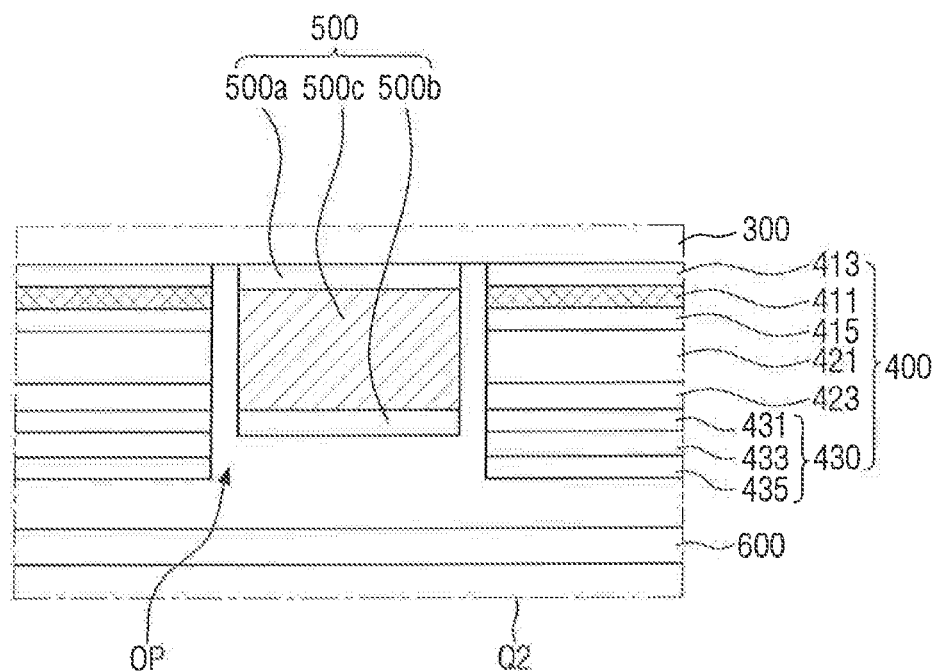
FIG. 7 is an enlarged cross-sectional view of a portion Q2 of FIG. 3 according to an exemplary embodiment of the inventive concept.

FIG. 7 is an enlarged cross-sectional view of a portion Q2 of FIG. 3, and more for example, an enlarged cross-sectional view of the cover panel sheet of FIG. 3.

Referring to FIGS. 3 and 7, the cover panel sheet 400 includes a light-absorbing member 411 disposed under the display panel 300, a top coupling layer 413 disposed between the light-absorbing member 411 and the display panel 300, a first interlayer coupling layer 415 disposed under the light-absorbing member 411, and a buffer member 421 disposed under the first interlayer coupling layer 415. The cover panel sheet 400 may further include a second interlayer coupling layer 423 disposed under the buffer member 421, and a heat-dissipating member 430 disposed under the second interlayer coupling layer 423.

The light-absorbing member 411 is disposed under the display panel 300 and blocks transmission of light to prevent the components disposed below the light-absorbing member 411 from being viewed from above. The light-absorbing member 411 may have a variety of structures.

For example, the light-absorbing member 411 may be made up of multiple layers, and may include a base and a light-absorbing layer disposed on the upper surface of the base.

The base may be made of, for example, polyethylene terephthalate (PET), polyimide (PI), polycarbonate (PC), polyethylene (PE), polypropylene (PP), polysulfone (PSF), polymethylmethacrylate (PMMA), triacetylcellulose (TAC), cycloolefin polymer (COP), etc.

The light-absorbing layer may include a light-absorbing material such as a black pigment and a dye. For example, the light-absorbing layer may be a black ink. The light-absorbing layer may be formed on the upper surface of the base by coating or printing.

To effectively transfer the vibration generated by the vibrating element 500, the light-absorbing member 411 may not overlap with the vibrating element 500. It is, however, to be understood that the inventive concept is not limited thereto. In other implementations, the light-absorbing member 411 may be interposed between the vibrating element 500 and the display panel 300 to prevent the vibrating element 500 from being seen from the outside.

The top coupling layer 413 is disposed on the upper surface of the light-absorbing member 411. The top coupling layer 413 serves to attach the cover panel sheet 400 to the lower surface of the display panel 300. The top coupling layer 413 may include an adhesive layer or a resin layer. For example, the top coupling layer 413 may contain a polymer material that is sorted into a silicone polymer, a urethane polymer, an SU polymer having silicone-urethane hybrid structure, an acrylic polymer, an isocyanate polymer, a polyvinyl alcohol polymer, a gelatin polymer, a vinyl polymer, a latex polymer, polyester polymer, water-based polyester polymer, etc.

The top coupling layer 413 may not overlap with the vibrating element 500, and the vibrating element 500 may be coupled to the display panel 300 by a separate coupling member. It is, however, to be understood that the inventive concept is not limited thereto. In other implementations, the top coupling layer 413 may be formed on the entire lower surface of the display panel 300 to couple the vibrating element 500 with the display panel 300.

In exemplary embodiments of the inventive concept, the top coupling layer may have an embossed shape. The embossed shape may be formed on the contact surface of the top coupling layer 413 with the display panel 300. When the top coupling layer 413 has an embossed upper surface, the embossed shape serves as an air passage when the cover panel sheet 400 is attached to the lower surface of the display panel 300, thus reducing bubbles. When the top coupling layer 413 is completely attached under the display panel 300, the embossed shape may collapse and become flat, but the embossed shape may remain in a part of the top coupling layer 413.

The first interlayer coupling layer 415 is disposed on the lower surface of the light-absorbing member 411. The first interlayer coupling layer 415 couples the light-absorbing member 411 with the buffer member 421.

The material of the first interlayer coupling layer 415 may be selected from among the above-listed materials of the top coupling layer 413.

The buffer member 421 absorbs an external shock to thus prevent the display panel 300, the window 100, and the like from being damaged. The buffer member 421 may be made up of a single layer or may be a stack of multiple layers. For example, the buffer member 421 may be formed of a polymer resin such as polyurethane, polycarbonate, polypropylene, or polyethylene, or may be formed of a material having elasticity such as a rubber or a sponge obtained by foaming a urethane-based material or an acrylic-based material. The buffer member 421 may be a cushion layer.

The buffer member 421 may not overlap with the vibrating element 500. As described above, the buffer member 421 may be made of a material having elasticity. The vibrating element 500 generates vibration in response to a vibration signal or the like, and the generated vibration is transferred to the display panel 300. The buffer member 421 may not overlap with the vibrating element 500 so as to transfer the vibration generated in the vibrating element 500 to the display panel 300 without being absorbed by the buffer member 421.

The second interlayer coupling layer 423 serves to couple another member with the buffer member 421 and may be made of the materials listed above as the material of the top coupling layer 413. According to an exemplary embodiment of the inventive concept, the second interlayer coupling layer 423 can couple the heat-dissipating member 430 with the buffer member 421. In exemplary embodiments of the inventive concept, the second interlayer coupling layer 423 may not overlap with the vibrating element 500.

The heat-dissipating member 430 may be disposed under the second interlayer coupling layer 423. The heat-dissipating member 430 may include at least one heat-dissipating layer. In the example shown in FIG. 7, the heat-dissipating member 430 includes a first heat-dissipating layer 431, a second heat-dissipating layer 435, and a coupling layer 433.

The first heat-dissipating layer 431 and the second heat-dissipating layer 435 may be made of the same material or may be made of materials having different heat-dissipating properties. For example, the first heat-dissipating layer 431 may include graphite, carbon nanotubes, or the like. The second heat-dissipating layer 435 may include various materials capable of blocking electromagnetic waves and having excellent thermal conductivity. For example, the second heat-dissipating layer 435 may include a thin metal film such as copper, nickel, ferrite, or silver.

The second heat-dissipating layer 435 may be disposed under the first heat-dissipating layer 431. In exemplary embodiments of the inventive concept, the first heat-dissipating layer 431 may overlap the second heat-dissipating layer 435, and the first heat-dissipating layer 431 may be smaller than the second heat-dissipating layer 435 such that the side surfaces of the former may be located more to the inside than those of the latter.

The coupling layer 433 may be disposed between the first heat-dissipating layer 431 and the second heat-dissipating layer 435. The coupling layer 433 may couple the first heat-dissipating layer 431 with the second heat-dissipating layer 435. The material of the coupling layer 433 may be selected from among the above-listed materials of the top coupling layer 413. In exemplary embodiments of the inventive concept, the heat-dissipating member 430 may not overlap with the vibrating element 500. This is to provide a space for the vibration of the vibrating element 500.

An air layer may be formed between the heat-dissipating member 430 and the bracket 600. It is, however, to be understood that the inventive concept is not limited thereto. For example, a bottom coupling member may be disposed under the heat-dissipating member 430. The bottom coupling member may couple the cover panel sheet 400 with the bracket 600. The bottom coupling member may be in the form of a tape having two coupling layers on its two sides, e.g., a double-sided adhesive tape.

The cover panel sheet 400 may include the opening OP. The opening OP may be formed by removing a part of the cover panel sheet 400, via which the lower surface of the display panel 300 is exposed. In an exemplary embodiment of the inventive concept, a part of each of the constituent layers of the cover panel sheet 400 that overlaps with the opening OP may be completely removed. In exemplary embodiments of the inventive concept, however, only some of the constituent layers of the cover panel sheet 400 may be removed such that a trench may be formed. The cover panel sheet including the trench will be described later with reference to FIG. 8.

The vibrating element 500 may come in contact with the display panel 300 in the opening OP. By bringing the vibrating element 500 into contact with the display panel 300, the vibration can be transferred more effectively since no other functional layer is interposed therebetween.

Additionally, the vibrating element 500 may include a first electrode 500a, a second electrode 500b opposed to the first electrode 500a, and a vibration material layer 500c sandwiched between the first and second electrodes 500a and 500b, which will be described in detail below with reference to FIG. 13.

Figure 8:
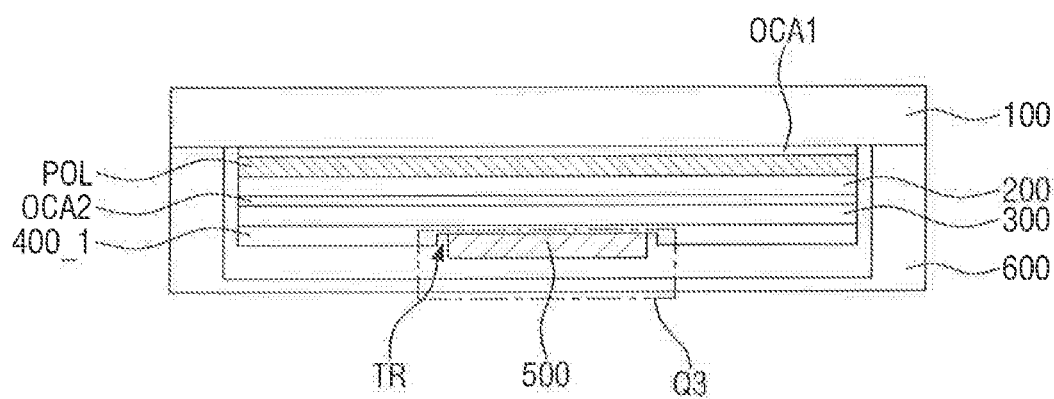
FIG. 8 is a cross-sectional view of a display device according to an exemplary embodiment of the inventive concept.
Figure 9:
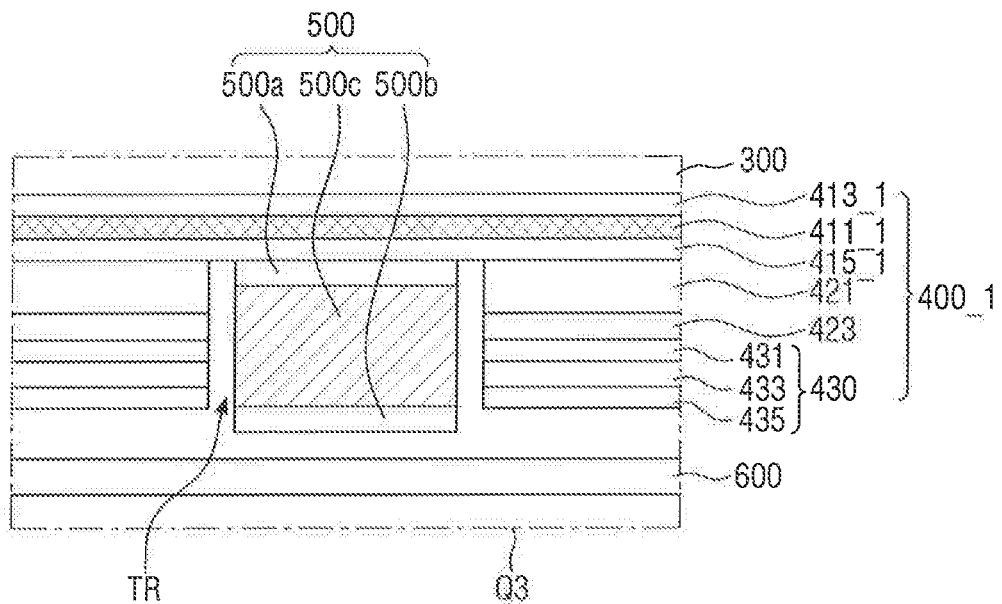
FIG. 9 is an enlarged cross-sectional view of a portion Q3 of FIG. 8 according to an exemplary embodiment of the inventive concept.

FIG. 8 is a cross-sectional view of a display device according to an exemplary embodiment of the inventive concept. FIG. 9 is an enlarged cross-sectional view of a portion Q3 of FIG. 8 according to an exemplary embodiment of the inventive concept.

The exemplary embodiment shown in FIGS. 8 and 9 is different from the exemplary embodiments of FIGS. 3 and 7 in that some of the constituent layers of the cover panel sheet 400 are removed so that a trench TR is formed. In the following descriptions, descriptions will be made focusing on differences from the exemplary embodiment of FIG. 3.

Referring to FIG. 8, a display device 10_1 may include a cover panel sheet 400_1 having the trench TR that is concave toward the display panel 300, and the vibrating element 500 disposed in the trench TR of the cover panel sheet 400_1. The cover panel sheet 400_1 may include the trench TR. The area of the trench TR may be substantially equal to the area of the vibrating element 500 when viewed from the top. It is, however, to be understood that the inventive concept is not limited thereto. The area of the trench TR may be larger than the area of the vibrating element 500. The trench TR may be formed at the center of the cover panel sheet 400_1 in line with the vibrating element 500. When the display device 10_1 includes a plurality of the vibrating elements 500, a plurality of trenches TR may be formed or the plurality of the vibrating elements 500 may be disposed in a single trench TR.

Referring to FIG. 9, the trench TR may be formed by removing a part of each of the functional layers of the cover panel sheet 400_1. For example, an unremoved part of the each of the functional layers of the cover panel sheet 400_1 may remain below the display panel 300. The cover panel sheet 400_1 includes a light-absorbing member 411_1 disposed under the display panel 300, a top coupling layer 413_1 disposed between the light-absorbing member 411_1 and the display panel 300, a first interlayer coupling layer 415_1 disposed under the light-absorbing member 411_1, and the buffer member 421 disposed under the first interlayer coupling layer 415_1. The cover panel sheet 400 may further include the second interlayer coupling layer 423 disposed under the buffer member 421, and the heat-dissipating member 430 disposed under the second interlayer coupling layer 423.

The light-absorbing member 411_1 may be disposed such that it completely covers the vibrating element 500 thereunder. In other words, the vibrating element 500 can completely overlap the light-absorbing member 411_1. In addition, the light-absorbing member 411_1 may be disposed such that it completely covers the functional layers thereunder. The light-absorbing member 411_1 may be formed entirely below the display panel 300.

As the vibrating element 500 overlaps with the light-absorbing member 411_1, it is possible to prevent the vibrating element 500 from being seen from the outside.

The top coupling layer 413_1 may be interposed between the light-absorbing member 411_1 and the display panel 300 to attach the cover panel sheet 400_1 to the lower surface of the display panel 300. The top coupling layer 413_1 may include an adhesive layer or a resin layer. For example, the top coupling layer 413 may contain a polymer material that is sorted into a silicone polymer, a urethane polymer, an SU polymer having silicone-urethane hybrid structure, an acrylic polymer, an isocyanate polymer, a polyvinyl alcohol polymer, a gelatin polymer, a vinyl polymer, a latex polymer, polyester polymer, water-based polyester polymer, etc.

The top coupling layer 413_1 may be formed entirely below the display panel 300 and may overlap the light-absorbing member 411_1.

The first interlayer coupling layer 415_1 is disposed on the lower surface of the light-absorbing member 411_1. The first interlayer coupling layer 415_1 couples the light-absorbing member 411_1 with the buffer member 421. In addition, the first interlayer coupling layer 415_1 is disposed such that it overlaps with the vibrating element 500 to couple the light-absorbing member 411 with the vibrating element 500.

In exemplary embodiments of the inventive concept, a part of the first interlayer coupling layer 415_1 that overlaps with the trench TR may be removed. Then, the vibrating element 500 may be attached to the lower surface of the light-absorbing member 411_1 by a separate coupling member.

The material of the first interlayer coupling layer 415_1 may be selected from among the above-listed materials of the top coupling layer 413_1.

The buffer member 421 absorbs an external shock to thus prevent the display panel 300, the window 100, and the like from being damaged. The buffer member 421 may be made up of a single layer or may be a stack of multiple layers. For example, the buffer member 721 may be formed of a polymer resin such as polyurethane, polycarbonate, polypropylene, or polyethylene, or may be formed of a material having elasticity such as a rubber or a sponge obtained by foaming a urethane-based material or an acrylic-based material. The buffer member 721 may be a cushion layer.

A part of the buffer member 421 that overlaps with the trench TR may be removed. In other words, the buffer member 421 may not overlap with the vibrating element 500 in the trench TR. As the vibrating element 500 is attached under the display panel 300 without overlapping with the buffer member 421, the vibration can be more effectively transferred from the vibrating element 500.

The second interlayer coupling layer 423 serves to couple another member with the buffer member 421 and may be made of the materials listed above as the material of the top coupling layer 413. The second interlayer coupling layer 423 can couple the heat-dissipating member 430 with the buffer member 421. The second interlayer coupling layer 423 may not overlap with the vibrating element 500.

The heat-dissipating member 430 may be disposed under the second interlayer coupling layer 423. The heat-dissipating member 430 may include at least one heat-dissipating layer. In the example shown in the drawing, the heat-dissipating member 430 includes the two heat-dissipating layers 431 and 435 and the coupling layer 433.

The first heat-dissipating layer 431 and the second heat-dissipating layer 435 may be made of the same material or may be made of materials having different heat-dissipating properties. For example, the first heat-dissipating layer 431 may include graphite, carbon nanotubes, or the like. The second heat-dissipating layer 435 may include various materials capable of blocking electromagnetic waves and having excellent thermal conductivity. For example, the second heat-dissipating layer 435 may include a thin metal film such as copper, nickel, ferrite, or silver.

The second heat-dissipating layer 435 may be disposed under the first heat-dissipating layer 431. In exemplary embodiments of the inventive concept, the first heat-dissipating layer 431 may overlap the second heat-dissipating layer 435, and the first heat-dissipating layer 431 may be smaller than the second heat-dissipating layer 435 such that the side surfaces of the former may be located more to the inside than those of the latter.

The coupling layer 433 may be disposed between the first heat-dissipating layer 431 and the second heat-dissipating layer 435. The coupling layer 433 may couple the first heat-dissipating layer 431 with the second heat-dissipating layer 435 and may completely cover the first heat-dissipating layer 431. The material of the coupling layer 433 may be selected from among the above-listed materials of the top coupling layer 413.

A part of the heat-dissipating member 430 that overlaps with the trench TR may be removed. In other words, the heat-dissipating member 430 may not overlap with the vibrating element 500 in the trench TR.

The trench TR may be formed by removing a part of each of the functional layers of the cover panel sheet 400_1. For example, after the constituent layers of the cover panel sheet 400_1 are stacked on one another, a part of each of the layers that overlaps with the trench TR may be removed. It is to be noted that the trench TR may be formed in a variety of ways. For example, the trench TR may be formed in such a manner that a part of each of the layers is removed and then the layers are stacked on one another.

The bottom surface of the trench TR may be the first interlayer coupling layer 415_1, and both side walls of the trench TR may be the side surfaces of each of the buffer member 421, the second interlayer coupling layer 423, and the heat-dissipating member 430.

Figure 10:
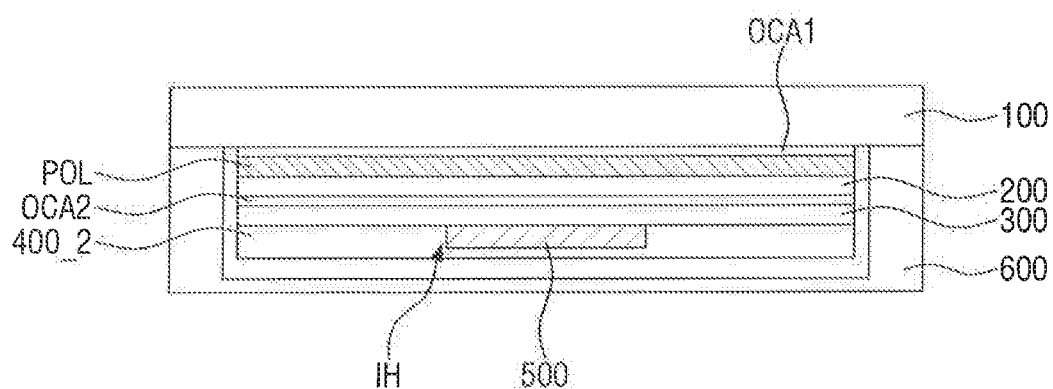
FIGS. 10 to 12 are cross-sectional views of display devices according to exemplary embodiments of the inventive concept.
Figure 11:
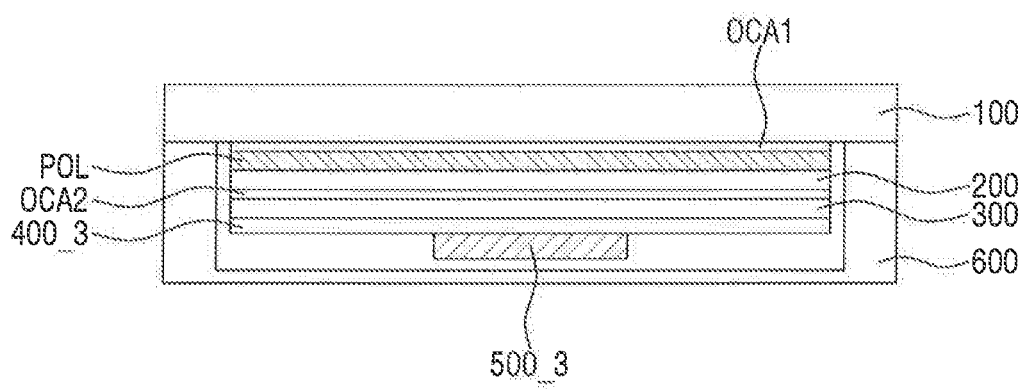
Figure 12:
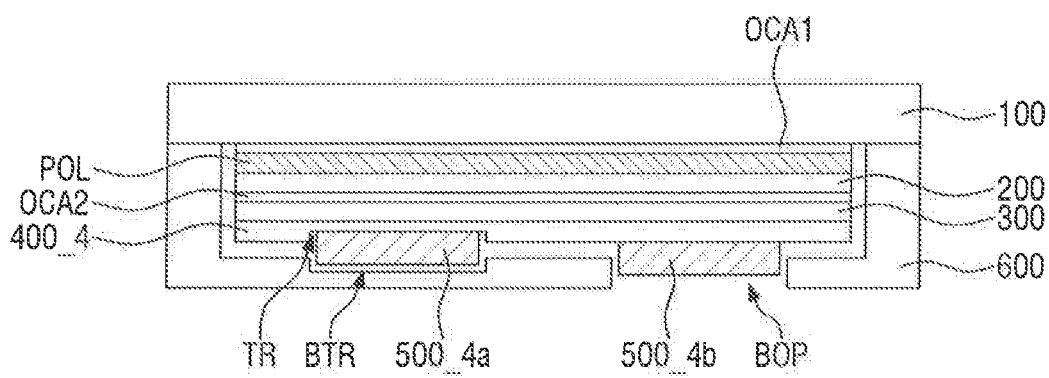

FIGS. 10 to 12 are cross-sectional views of display devices according to exemplary embodiments of the inventive concept. The exemplary embodiments shown in FIGS. 10 to 12 are different from the exemplary embodiment of FIG. 3 in that the vibrating elements are disposed at different positions of cover panel sheets. In the following descriptions, descriptions will be made focusing on differences from the exemplary embodiment of FIG. 3.

FIG. 10 shows a cover panel sheet having an inner groove. Referring to FIG. 10, a display device 10_2 may include a cover panel sheet 400_2 having an inner groove IH therein and the vibrating element 500 disposed in the inner groove IH of the cover panel sheet 400_2. The vibrating element 500 is attached directly under the display panel 300, and the cover panel sheet 400_2 having the inner groove IH therein may cover the vibrating element 500. The size of the inner groove IH may be substantially equal to the size of the vibrating element 500. It is, however, to be understood that the inventive concept is not limited thereto. The size of the inner groove IH may be larger than the size of the vibrating element 500. The inner groove IH may be formed at the center of the cover panel sheet 400_2 in line with the vibrating element 500. When the display device 10_2 includes a plurality of the vibrating elements 500, a plurality of inner grooves IH may be formed or the plurality of the vibrating elements 500 may be disposed in a single inner groove IH.

Referring to FIG. 11, a display device 10_3 may include a vibrating element 500_3 disposed on the cover panel sheet 400_3. Unlike the above-described exemplary embodiment, the cover panel sheet 400_3 includes neither the trench TR nor the inner groove IH but the vibrating element 500_3 may be disposed directly on the cover panel sheet 400_3. In this instance, the cover panel sheet 400_3 may include a functional layer including a light-absorbing member to prevent the vibrating element 500_3 from being seen from the outside.

In addition, in an exemplary embodiment of the inventive concept, when the vibrating element 500_3 is utilized as an acoustic element for generating sound, a separate diaphragm may be disposed between the cover panel sheet 400_3 and the vibrating element 500_3.

Referring to FIG. 12, a display device 10_4 may include vibrating elements 500_4a and 500_4b in line with a bracket trench BTR and a bracket opening BOP formed in the bracket 600, respectively. The bracket trench BTR and the bracket opening BOP may be formed in the bottom surface of the bracket 600.

The bracket trench BTR may be a groove formed by removing a part of the bottom surface of the bracket 600. The bracket trench BTR may be formed such that it overlaps with the vibrating element 500_4a in a direction perpendicular to the display panel 300. In other words, the bracket trench BTR may be a space provided between the cover panel sheet 400_4 and the bracket 600 where the vibrating element 500_4a is disposed. The bottom surface of the bracket trench BTR may be opposed to the cover panel sheet 400_4. The area of the bottom surface of the bracket trench BTR may be equal to or larger than the area of the vibrating element 500_4a. In addition, the height of the side walls of the bracket trench BTR may be lower than or equal to the height of the vibrating element 500_4a. If the thickness of the vibrating element 500_4a is increased to increase the intensity of the vibration fed to a user, it is possible to dispose the vibrating element 500_4a on the cover panel sheet 400_4 without increasing the thickness by way of forming the bracket trench BTR in the bottom surface of the bracket 600.

The bracket opening BOP may be a hole formed in the bottom surface of the bracket 600. Like the above-described bracket trench BTR, the bracket opening BOP may be formed such that it overlaps with the vibrating element 500_4b. Even if the thickness of the vibrating element 500_4b is increased, the display device 10_4 can be implemented without further increasing the thickness. The area of the bracket opening BOP may be equal to or larger than the area of the vibrating element 500_4b.

Although FIG. 12 shows that the vibrating element 500_4a is attached under the cover panel sheet 400_4, this is merely illustrative. It may be attached on the bottom surface of the bracket 600 or in the bracket trench BTR. The vibrating element attached on the bracket 600 will be described later with reference to FIG. 25.

As described above, the vibrating element 500 may be disposed inside the cover panel sheet 400 to generate vibration. Hereinafter, the operation characteristics of the vibrating element 500 will be described in detail with reference to FIG. 13.

Figure 13:
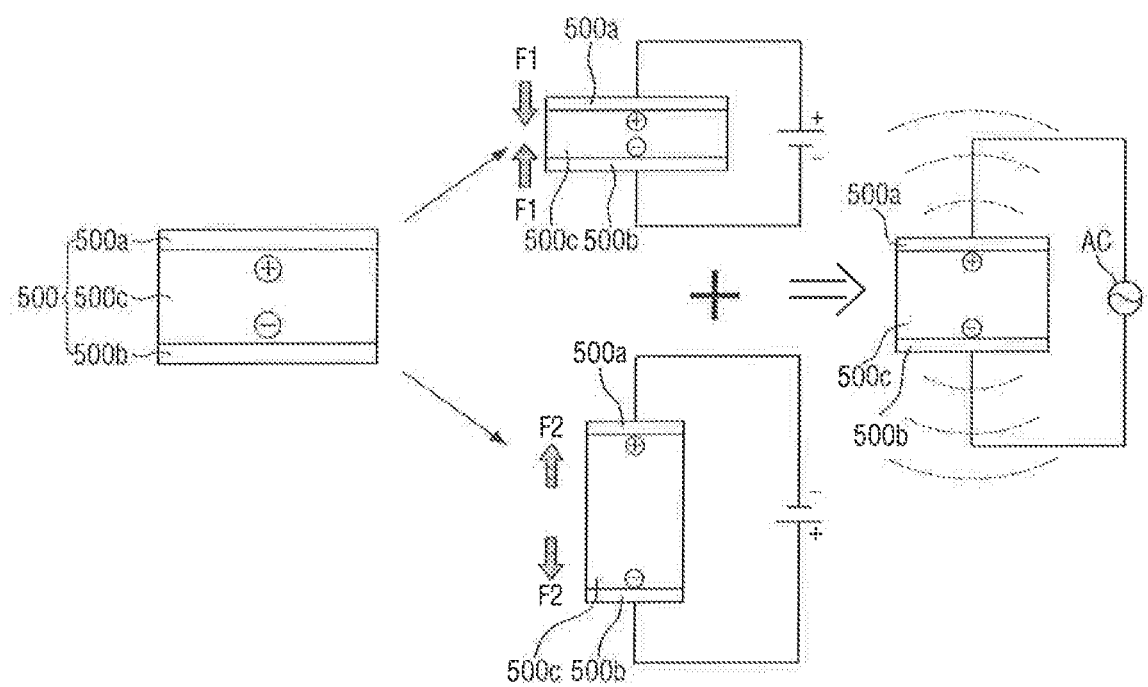
FIG. 13 is a diagram for conceptually illustrating operation characteristics of a vibration element according to an exemplary embodiment of the inventive concept.

FIG. 13 is a diagram for conceptually illustrating operation characteristics of a vibrating element according to an exemplary embodiment of the inventive concept. Referring to FIG. 13, the vibrating element 500 may include the first electrode 500a, the second electrode 500b opposed to the first electrode 500a, and the vibration material layer 500c sandwiched between the first and second electrodes 500a and 500b.

The first electrode 500a and the second electrode 500b may be made of a conductive material. For example, the first electrode 500a and the second electrode 500b may include a transparent conductor such as ITO or IZO, an opaque metal, a conductive polymer, or a carbon nanotube (CNT).

The vibration material layer 500c may include a piezoelectric material that vibrates by an electric field. For example, the vibration material layer 500c may include at least one of a piezoelectric such as lead zirconate titanate (PZT), a piezoelectric film such as a polyvinylidene fluoride (PVDF) film, and an electro active polymer.

The vibration material layer 500c may be compressed or relaxed depending on the polarity of the voltage applied thereto. For example, as shown in FIG. 13, when a positive voltage is applied to the first electrode 500a and a negative voltage is applied to the second electrode 500b, a compressive force F1 may be created in the vibration material layer 500c so that it may contract in the thickness direction. On the other hand, when a negative voltage is applied to the first electrode 500a and a positive voltage is applied to the second electrode 500b, a relaxation force F2 is created in the vibration material layer 500c so that it may expand in the thickness direction. Accordingly, when an alternating voltage (e.g., a voltage with alternating polarities) is applied to the first electrode 500a and the second electrode 500b, the vibration material layer 500c may repeatedly contract and expand. By such a phenomenon, vibration is created in a particular area of the display panel 300 to which the vibrating element 500 is attached, and the vibration can be transferred to the user. When the organic light-emitting display panel is used as the display panel 300, vibration can be transferred without image distortion due to the vibration.

Although the vibrating element 500 includes a piezoelectric element in the exemplary embodiment shown in FIG. 13, this is merely illustrative. For example, the vibrating element 500 may include a permanent magnet and a coil that winds the permanent magnet and flows current in response to an acoustic signal. Vibration may be generated by electromagnetic force created by the current flowing through the coil.

The display device 10 may include the touch member 200 and the vibrating element 500 so that it can recognize a user's touch on the display device 10 and can provide a vibration feedback to the user. For example, the display device 10 can provide the user with visual information using the display panel 300 as well as haptic information using the vibrating element 500. The vibrating element 500 can provide haptic information that cannot be provided using the display panel 300. Haptic information together with visual information can provide a user with more realistic feedback. Hereinafter, the operations performed by the constituent elements of the display device 10 when a user touches the display device 10 will be described in detail.

Figure 14:
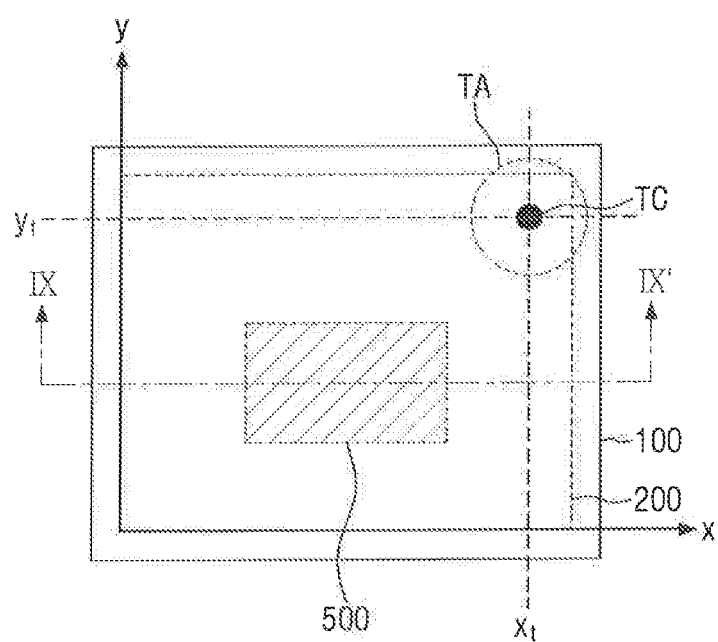
FIGS. 14 and 15 are a plan view and a schematic view, respectively, for illustrating an operation when a user touches a display device according to an exemplary embodiment of the inventive concept.
Figure 15:
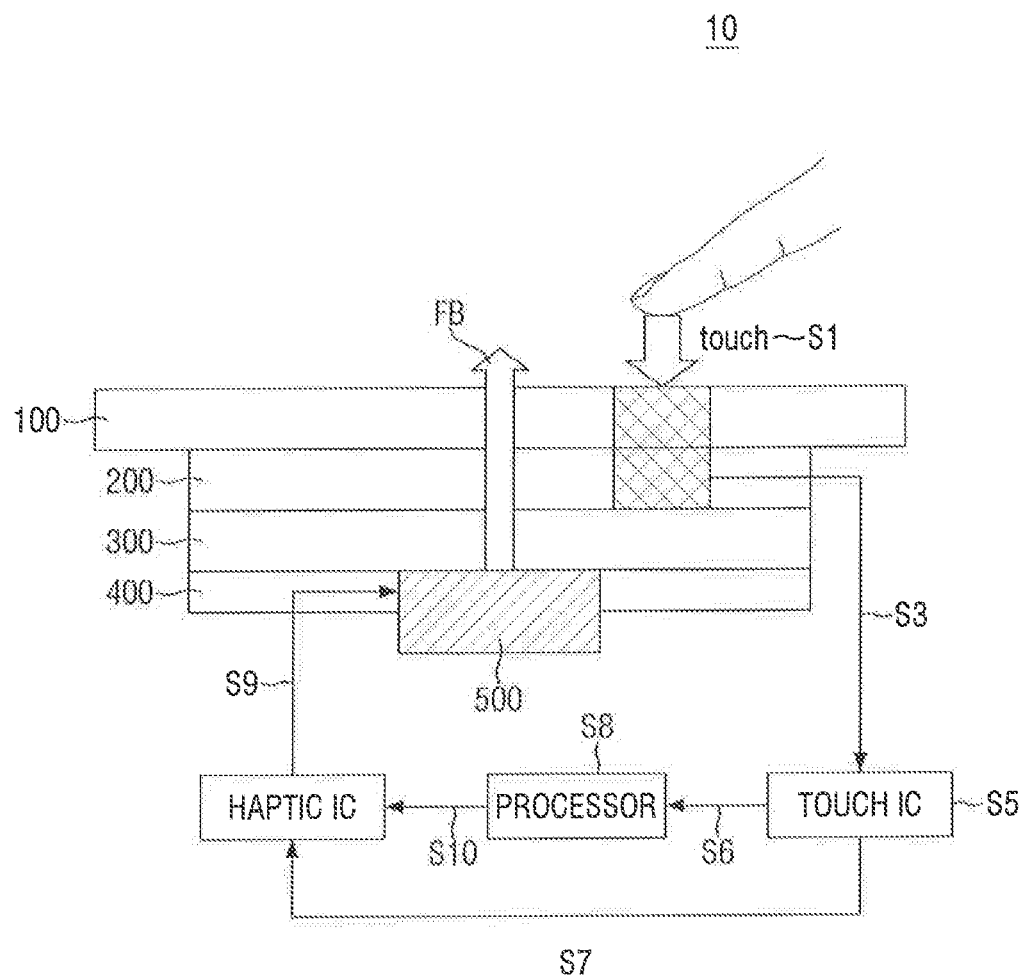
Figure 16:
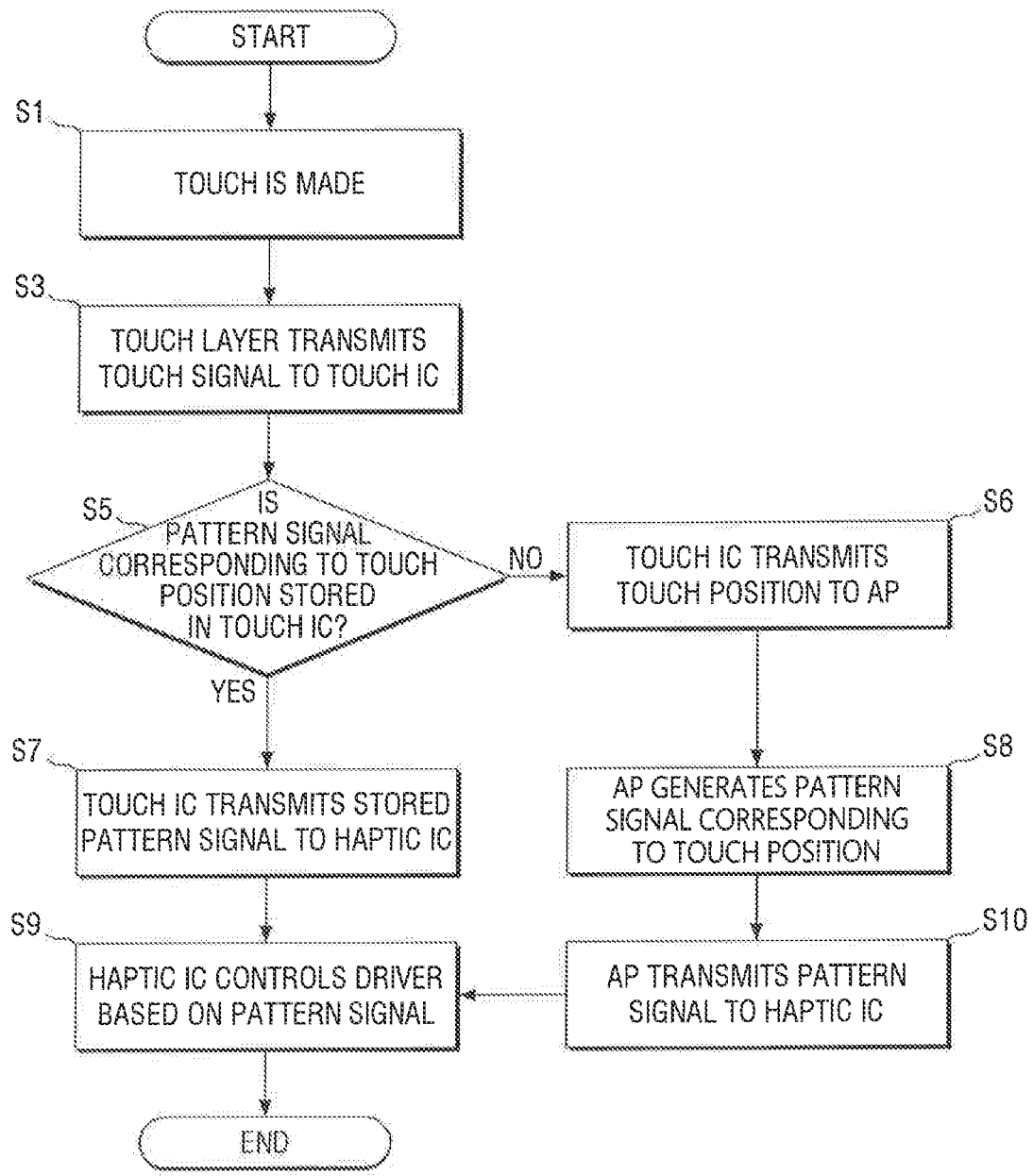
FIG. 16 is a flowchart for illustrating an operation when a user touches a display device according to an exemplary embodiment of the inventive concept.

FIGS. 14 and 15 are a plan view and a schematic view, respectively, for illustrating an operation when a user touches a display device according to an exemplary embodiment of the inventive concept. FIG. 16 is a flowchart for illustrating an operation when a user touches a display device according to an exemplary embodiment of the inventive concept. For convenience of illustration, the bracket 600 of the display device 10 will be omitted.

Referring to FIGS. 14 to 16, the display device 10 may include the window 100, the touch member 200, the display panel 300, the cover panel sheet 400, and the vibrating element 500.

The window 100 may include a touch area TA when viewed from the top. The touch area TA may refer to an area where a user's touch is made. For example, when a user touches a surface of the window 100, the touch area TA may be a region of the display device 10 overlapping with the position where the touch is made in the vertical direction of the window 100. The touch area TA may be formed around a touch center TC.

The touch center TC may be defined based on x-axis and y-axis coordinates on the touch member 200. The x-axis may be a line extended from a side of the touch member 200, and the y-axis may be a line extended from another side of the touch member 200 perpendicular to the side when viewed from the top. For example, the x-axis may be a line extended from one of the longer sides of the touch member 200, and the y-axis may be a line extended from one of the shorter sides connected to the longer side of the touch member 200. The touch center TC includes x-axis and y-axis coordinates corresponding to the x-axis and y-axis, respectively. For example, the coordinates of the touch center TC may be expressed as $(x_t, y_t)$. The touch coordinates may be defined as the coordinates of the touch center TC and may be values indicating information of the position where the touch is made. The touch area TA may be formed on the window 100 out of (e.g., not overlapping) the touch member 200 but the touch center TC can be formed only in a region overlapping the touch member 200.

The touch member 200 may generate a touch signal when the user touches the surface on the window 100. In other words, the touch member 200 can sense a touch signal input from the outside. The touch member 200 may acquire touch information by self-capacitance sensing and/or mutual-capacitance sensing. In an exemplary embodiment of the inventive concept, the touch member 200 may be an infrared-type panel.

In exemplary embodiments of the inventive concept, the touch member 200 may be formed integrally with the display panel 300. For example, the touch electrodes of the touch member 200 may be disposed directly on an encapsulation layer of the display panel 300. Alternatively, the touch member 200 may be formed separately from the display panel 300 and may be coupled to the display panel 300 via a separate coupling layer or the like.

The display panel 300 may present images toward the window 100. The window 100 delivers the presented image to the user, and the user may touch the display device 10 based on the presented image information.

The cover panel sheet 400 and the vibrating element 500 may be disposed under the display panel 300. The display device 10 may receive a user's touch and generate a variety of pattern signals depending on the touch coordinates. The vibrating element 500 may generate vibration by receiving the generated pattern signal. The vibration may be transferred to the user as haptic information. Hereinafter, a method of driving the display device 10 will be described in detail with reference to the flowchart of FIG. 16.

Referring to FIGS. 15 and 16, a method of driving a display device includes: sensing a touch signal when a touch is made (operation S1); transferring the sensed touch signal to a touch IC (a touch drive chip) (operation S3); and detecting a touch position (touch coordinates) from the touch signal to determine whether a pattern signal corresponding to the touch position (touch coordinates) is stored in the touch IC (touch drive chip) (operation S5).

The method may further include: transferring, by the touch IC (touch drive chip), the touch position (touch coordinates) to a processor if it is determined that the pattern signal is not stored in the touch IC (touch drive chip) (operation S6); generating, by the processor, a pattern signal corresponding to the touch position (touch coordinates) (operation S8); and transferring, by the processor, the pattern signal to a haptic IC (haptic drive chip) (operation S10).

The method may also include: transferring, by the touch IC, the pattern signal stored in the haptic IC (haptic drive chip) if it is determined that the pattern signal is stored in the touch IC (touch drive chip) (operation S7).

Finally, the method of driving the display device may include: controlling the driving part (vibrating element) based on the pattern signal transferred from the haptic IC (haptic drive chip) (operation S9).

The touch signal is generated upon receiving a user's touch. The touch signal may contain the touch coordinates, e.g., the information indicative of the position where a touch is made. The touch member 200 may sense a touch signal generated by a user's touch.

The touch member 200 may transfer a touch signal to the touch drive chip (touch IC). The touch drive chip (touch IC) receives the touch signal and detects the touch coordinates of the touch signal. The touch coordinates may be the coordinates of the touch center TC located in the touch area TA as described above with reference to FIG. 14. The touch coordinates may be expressed as $(x_t, y_t)$, with the x-axis coordinate value and the y-axis coordinate value corresponding to the imaginary coordinate axes. When multiple touches are made such that multiple touch signals are generated, the touch center TC is determined for each of the touch signals. For example, each touch has its own touch coordinates.

The touch drive chip (touch IC) may detect the touch coordinates according to the touch signal to determine whether or not the pattern signal corresponding to the touch coordinates is stored. The pattern signal may be used to control the vibrating element 500. Pattern signals corresponding to frequently generated touch signals may be stored in the touch drive chip (touch IC) in advance.

When the pattern signal is not stored in the touch drive chip (touch IC), the touch drive chip (touch IC) may transmit the touch coordinates to the processor. The processor may generate a pattern signal corresponding to the transmitted touch coordinates. The pattern signal may be variously generated depending on the touch coordinates. It is, however, to be understood that the inventive concept is not limited thereto. The processor may generate different pattern signals depending on the type of image presented by the display panel 300 to the user, the number of touches, the touch time, or the like, even if it receives the same touch coordinates. In addition, the processor may transmit the pattern signal to the haptic drive chip (haptic IC).

On the other hand, if the pattern signal is previously stored in the touch drive chip (touch IC), the touch drive chip (touch IC) may transmit the stored pattern signal to the haptic drive chip (haptic IC). For example, the pattern signal may be directly transmitted from the touch drive chip (touch IC) to the haptic drive chip (haptic IC) without going through the processor. In this manner, the process of transmitting the pattern signal to the vibrating element 500 can be shortened. As a result, it is possible to transfer fast feedback (FB) to the user and reduce the power consumption by the processor.

The haptic drive chip (haptic IC) may control the vibrating element 500 based on the pattern signal transmitted from the touch drive chip (touch IC) or the processor. The pattern signal may have amplitude and frequency signals for controlling the vibrating element 500. The vibrating element 500 may be controlled in accordance with the pattern signal, and may transfer haptic feedback FB to the user by creating vibration. There may be a variety of pattern signals, and thus a variety of types of haptic feedbacks may be transferred from the vibrating element 500 to the user.

The display device 10 may provide the user with vibrations having different amplitudes and frequencies. When there is a single touch, the display device 10 may provide a haptic feedback corresponding to it. On the other hand, when there are multiple touches (hereinafter referred to as multi-touch), the display device 10 should be able to provide the user with vibration information which is different for different touch coordinates. In other words, the driving manner for multi-touch may be different from the driving manner for a single touch. Hereinafter, a method of driving a display device for multi-touch will be described.

Figure 17:
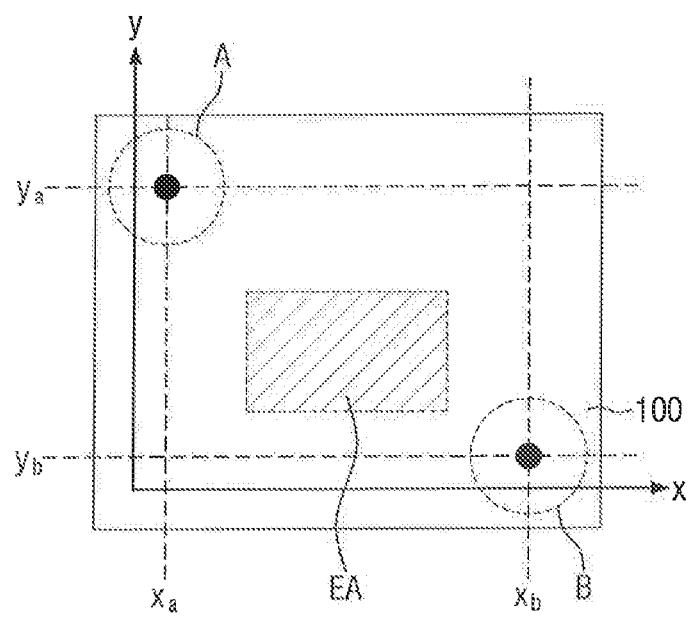
FIG. 17 is a plan view for illustrating an operation when a user multi-touches a display device according to an exemplary embodiment of the inventive concept.
Figure 18:
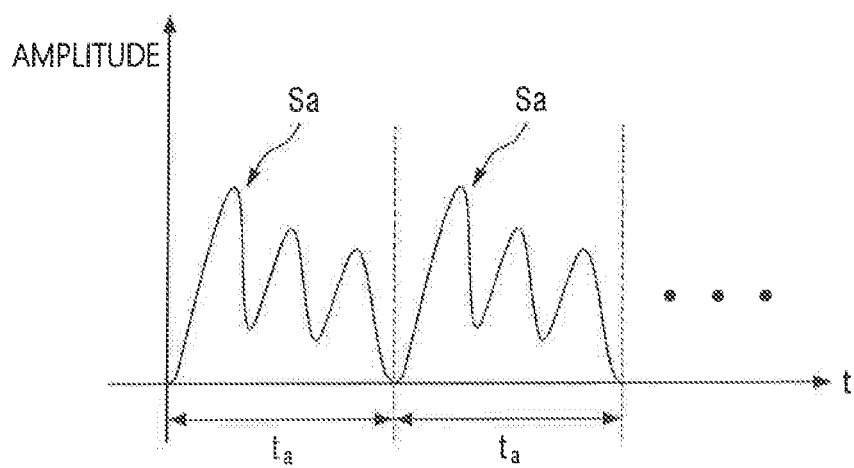
FIG. 18 is a first pattern signal for a first touch according to an exemplary embodiment of the inventive concept.
Figure 19:
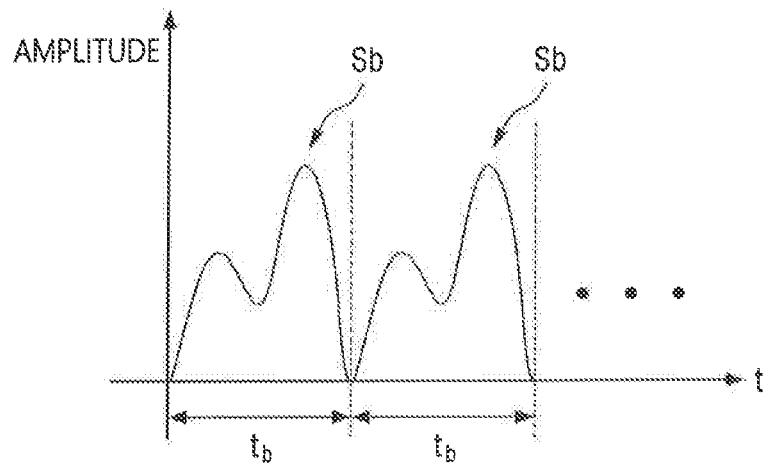
FIG. 19 is a second pattern signal for a second touch according to an exemplary embodiment of the inventive concept.
Figure 20:
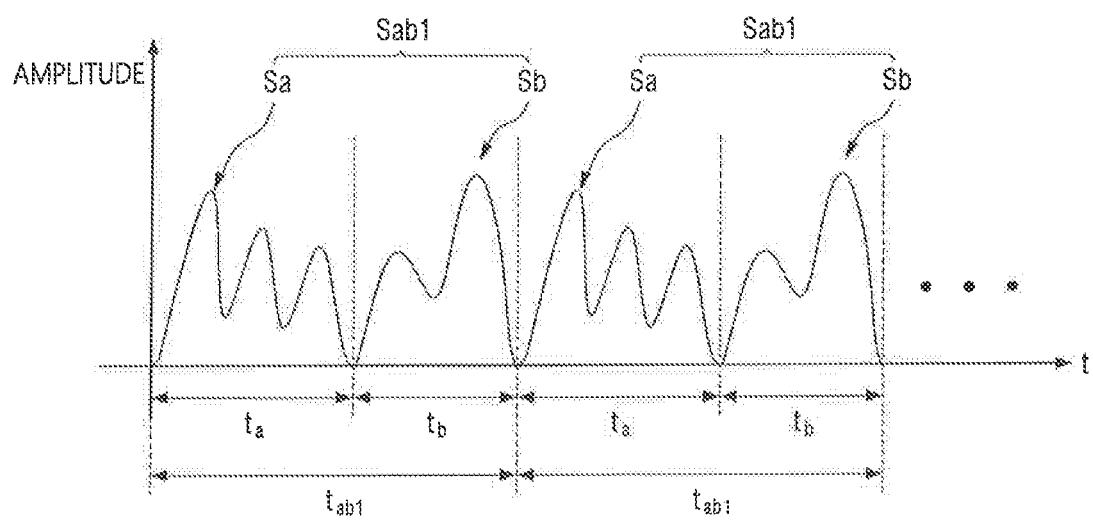
FIG. 20 is a pattern signal for multi-touch of a first touch and a second touch generated substantially simultaneously according to an exemplary embodiment of the inventive concept.
Figure 21:
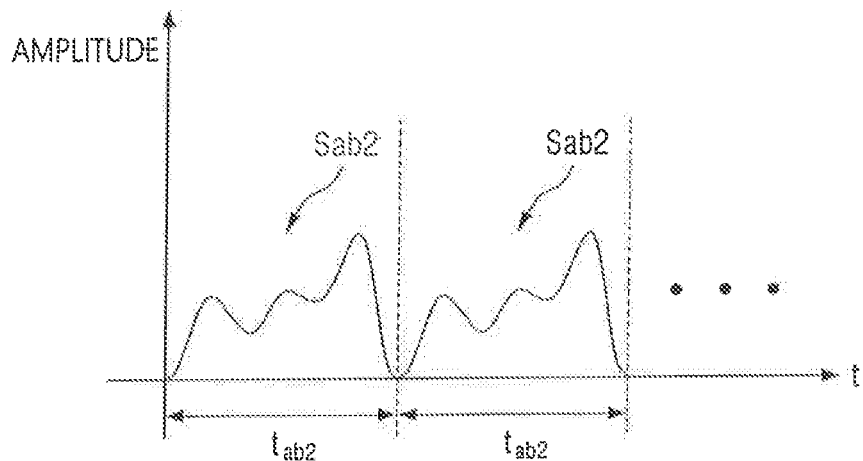
FIG. 21 is a pattern signal for multi-touch of a first touch and a second touch generated substantially simultaneously according to an exemplary embodiment of the inventive concept.

FIG. 17 is a plan view when a user multi-touches a display device according to an exemplary embodiment of the inventive concept. FIG. 18 is a first pattern signal for a first touch according to an exemplary embodiment of the inventive concept. FIG. 19 is a second pattern signal for a second touch according to an exemplary embodiment of the inventive concept. FIG. 20 is a pattern signal for multi-touch of a first touch and a second touch generated substantially simultaneously according to an exemplary embodiment of the inventive concept. FIG. 21 is a pattern signal for multi-touch of a first touch and a second touch generated substantially simultaneously according to an exemplary embodiment of the inventive concept.

FIG. 17 shows that a first touch A and a second touch B are generated on the display device 10. The first touch A generates a first touch signal, and the second touch B generates a second touch signal.

Referring to FIG. 17, the first touch A and the second touch B may be made at different positions. The first touch A and the second touch B may have different touch coordinates. For example, the first touch coordinates of the first touch A may be expressed as $(x_a, y_a)$, and the second touch coordinates of the second touch B may be expressed as $(x_b, y_b)$. For example, when multi-touch is made, different touch coordinates may be generated. The touch member 200 may sense different touch signals to transmit them to the touch drive chip (touch IC). The touch drive chip (touch IC) may receive the touch signals and detect the first touch coordinates $(x_a, y_a)$ and the second touch coordinates $(x_b, y_b)$. The touch drive chip (touch IC) or the processor may transmit different pattern signals to the haptic drive chip (haptic IC) depending on the detected first touch coordinates $(x_a, y_a)$ and second touch coordinates $(x_b, y_b)$. The vibrating element 500 may generate vibrations by receiving the generated pattern signals. If the first pattern signal for the first touch A and the second pattern signal for the second touch B are generated substantially simultaneously, the display device 10 may transmit information on the multi-touch to the user by a separate operation method. Hereinafter, a method of operating the display device 10 for multi-touch will be described with reference to FIGS. 18 to 21.

Referring to FIGS. 17, 18, and 19, the first pattern signal Sa may be a periodic signal having the period $t_a$, with varying amplitude. The second pattern signal Sb may be a periodic signal having the period $t_b$, with varying amplitude. In other words, the pattern signals Sa and Sb may be periodic signals having the periods $t_a$ and $t_b$, respectively, whose amplitudes vary with time.

When only the first touch A is made on the display device 10, the vibrating element 500 may receive the first pattern signal Sa and may provide the user with the first vibration for the first touch A. When only the second touch B is made on the display device 10, the vibrating element 500 may receive the second pattern signal Sb and may provide the user with the second vibration for the second touch B. The first vibration and the second vibration have different frequencies and/or amplitudes from each other, whereby the vibrating element 500 can transfer different haptic feedbacks to the user.

As such, when touches are made sequentially, the display device 10 sequentially outputs pattern signals corresponding to the touches, respectively, and may transfer different haptic feedbacks to the user. In contrast, when the first touch A and the second touch B are substantially simultaneously generated in the display device 10 including the single vibrating element 500, the vibrating element 500 may be operated in a manner different from the above-described manner so as to separately transfer the feedback for the first touch and the feedback for the second touch. Hereinafter, a method of driving the display device for multi-touch will be described in detail with reference to FIGS. 20 and 21.

FIGS. 20 and 21 show multi-pattern signals for multi-touch of a first touch and a second touch generated substantially simultaneously. A first multi-pattern signal Sab1 according to the exemplary embodiment of FIG. 20 is created by operating the vibrating element differently for different periods of time. A second multi-pattern signal Sab2 according to the exemplary embodiment of FIG. 21 is created by synthesizing the pattern signals.

Referring to FIGS. 17 to 20, the first multi-pattern signal Sab1 may be a signal in which the first pattern signal Sa and the second pattern signal Sb are repeated alternately. For example, the first multi-pattern signal Sab1 may be a time-dividing signal in which the first pattern signal Sa and the second pattern signal Sb are provided at different periods of time. The period $t_{ab1}$ of the first multi-pattern signal Sab1 may be equal to the sum of the period $t_a$ of the first pattern signal Sa and the period $t_b$ of the second pattern signal Sb. The first multi-pattern signal Sab1 has the period of $t_{ab1}$ and is transmitted to the vibrating element 500. The vibrating element 500 may provide a feedback for the first touch and a haptic feedback for the second touch to the user.

As used herein, the time-dividing signal refers to a signal consisting of the first pattern signal Sa and the second pattern signal Sb which are provided alternately during first to fourth periods of time, for example, the first pattern signal Sa during the first period of time, the second pattern signal Sb during the second period of time, the first pattern signal Sa again during the third period of time, the second pattern signal Sb again during the fourth period of time, and so on.

For example, the time-dividing signal may include two types of pattern signals alternately repeated over time. In other words, the first vibration for the first pattern signal Sa and the second vibration for the second pattern signal Sb may be created alternately.

The durations of the first period of time, the second period of time, the third period of time, and the fourth period of time may all be substantially the same, but may be different from one another depending on the periods $t_a$ and $t_b$ corresponding to the respective pattern signals. For example, the duration of the first period of time and that of the third period of time when the first pattern signal Sa is provided may be substantially the same as $t_a$, and the duration of the second period of time and that of the fourth period of time when the second pattern signal Sb is provided may be substantially the same as $t_b$. However, the duration of the first and third periods of time may be different from that of the second and fourth periods of time. Although the first to the fourth periods of time have been described as an example, it is to be understood that they may be repeated in the same manner after the fourth period of time.

As described above, the first vibration by the first pattern signal Sa can be distinguished from the second vibration by the second pattern signal Sb. The vibrating element 500 may receive the first multi-pattern signal Sab1 and transfer different haptic feedbacks to the user alternately. In this manner, the display device 10 may allow the user to recognize that the first touch A and the second touch B are generated substantially simultaneously. Although the two touches are generated substantially simultaneously in this exemplary embodiment, this is merely illustrative. For example, when three or more touches are made substantially simultaneously, the multi-pattern signal may be a signal in which pattern signals for the respective touches are sequentially repeated in the same manner as in the method of this exemplary embodiment.

By transferring the different vibrations for different periods of time as described above, the display device 10 can provide the user with the haptic feedbacks for the multi-touch by using the single vibrating element 500. For example, it is possible to reduce the number of vibrating elements for providing multi-touch feedbacks. By reducing the number of vibrating elements, the cost required for fabricating display devices can be reduced, and the thickness of display devices can be reduced compared to existing display devices.

Referring to FIG. 21, there is shown the second multi-pattern signal Sab2 different from the multi-pattern signal according to the exemplary embodiment described above with reference to FIG. 20. In the exemplary embodiment of FIG. 20, the first multi-pattern signal Sab1 is a signal in which the first pattern signal Sa and the second pattern signal Sb are alternately provided at different periods of time. In contrast, in the exemplary embodiment of FIG. 21, the second multi-pattern signal Sab2 is a synthesized signal of the first pattern signal Sa and the second pattern signal Sb. For example, according to this exemplary embodiment, the processor may synthesize the first pattern signal Sa and the second pattern signal Sb for the first touch A and the second touch B, respectively, to generate the second multi-pattern signal Sab2.

The first pattern signal Sa and the second pattern signal Sb may be synthesized in a variety of ways. For example, the first pattern signal Sa and the second pattern signal Sb are converted so that they have the same period $t_{ab2}$, and then they may be synthesized by using the average value of the amplitude of the first pattern signal Sa and the amplitude of the second pattern signal Sb. The method of synthesizing the first pattern signal Sa and the second pattern signal Sb is not limited thereto.

The second multi-pattern signal Sab2 generates a vibration having an amplitude and a frequency different from those of the first pattern signal Sa and from the second pattern signal Sb, to provide the user with a haptic feedback different from the haptic feedback for the first pattern signal Sa and from the haptic feedback for the second pattern signal Sb. For example, the user can recognize that the first touch and the second touch are made substantially simultaneously upon receiving the vibration generated by the second multi-pattern signal Sab2. By transferring the vibration by synthesizing the signals as described above, the display device 10 can provide the user with haptic feedback for multi-touch by using the single vibrating element 500.

Figure 22:
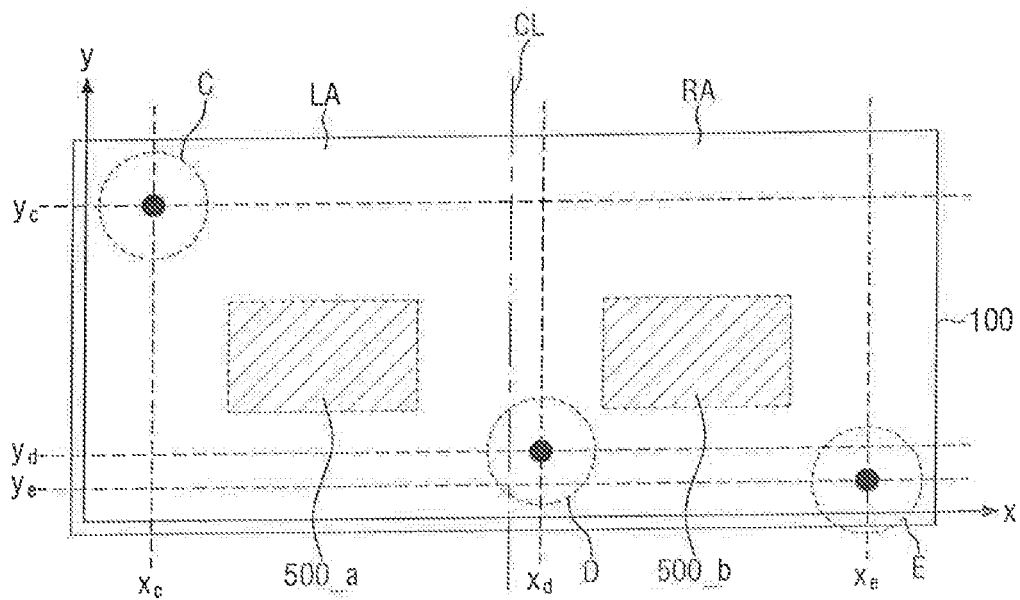
FIG. 22 is a plan view of a display device according to an exemplary embodiment of the inventive concept.

FIG. 22 is a plan view of a display device according to an exemplary embodiment of the inventive concept. The exemplary embodiment shown in FIG. 22 is different from the exemplary embodiment of FIG. 14 in that the former includes a plurality of vibrating elements 500_a and 500b. Hereinafter, description will be made focusing on the differences from the exemplary embodiment of FIG. 14. A method of operating a display device 10_5 including the plurality of vibrating elements 500_a and 500_b will be described.

Referring to FIG. 22, the display device 10_5 may include a first vibrating element 500_a and a second vibrating element 500_b.

The first vibrating element 500_a and the second vibrating element 500_b may be disposed at different positions. The first vibrating element 500_a may be disposed in a first area LA, and the second vibrating element 500_b may be disposed in a second area RA. The first area LA and the second area RA may be separated from each other along a center line CL. In FIG. 22, the first area LA may be a left area of the center line CL, and the second area RA may be a right area of the center line CL.

The first vibrating element 500_a may provide feedback on a touch that was made in the first area LA. The second vibrating element 500_b may provide feedback on a touch that was made in the second area RA. When a touch is made near the center line CL, the first vibrating element 500_a or the second vibrating element 500_b may provide feedback depending on the touch coordinates. When a touch is made on the center line CL, the first vibrating element 500_a and the second vibrating element 500_b together may provide feedback. It is, however, to be understood that the inventive concept is not limited thereto.

When the display device 10_5 includes the plurality of vibrating elements 500_a and 500_b, the first vibrating element 500_a and the second vibrating element 500_b may be driven individually. For example, for a third touch C made in the first area LA, the first vibrating element 500_a may provide a haptic feedback. For example, for a fourth touch D and a fifth touch E made in the second area RA, the second vibrating element 500_b may provide a haptic feedback. The pattern signals for the third touch C, the fourth touch D, and the fifth touch E may be generated in a manner similar to the pattern signals described above with reference to FIGS. 17 to 21. For example, the pattern signals may be generated by dividing periods of time or by synchronizing them, but the inventive concept is not limited thereto. In the following description, it is assumed that a multi-pattern signal is created by operating the vibrating element differently for different periods of time. Hereinafter, the pattern signals for the third touch C, the fourth touch D, and the fifth touch E will be described with reference to FIGS. 22, 23, and 24.

FIG. 22 shows that the third touch C is made on the first area LA, and the fourth touch D and the fifth touch E are made on the second area RA.

Figure 23:
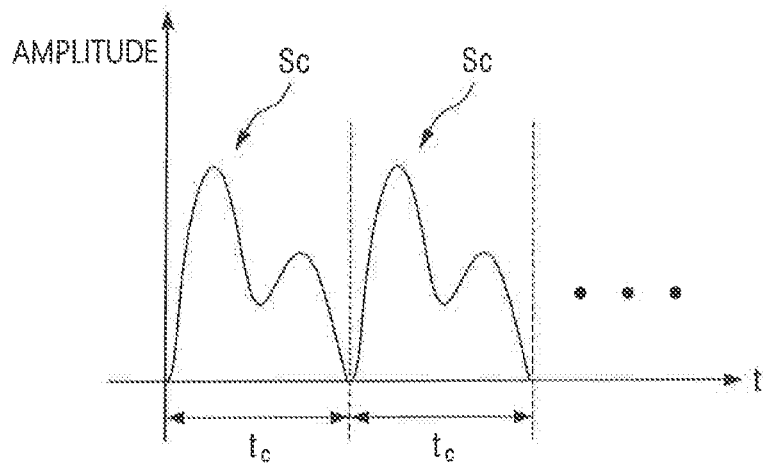
FIG. 23 is a graph showing a pattern signal for a third touch according to an exemplary embodiment of the inventive concept.
Figure 24:
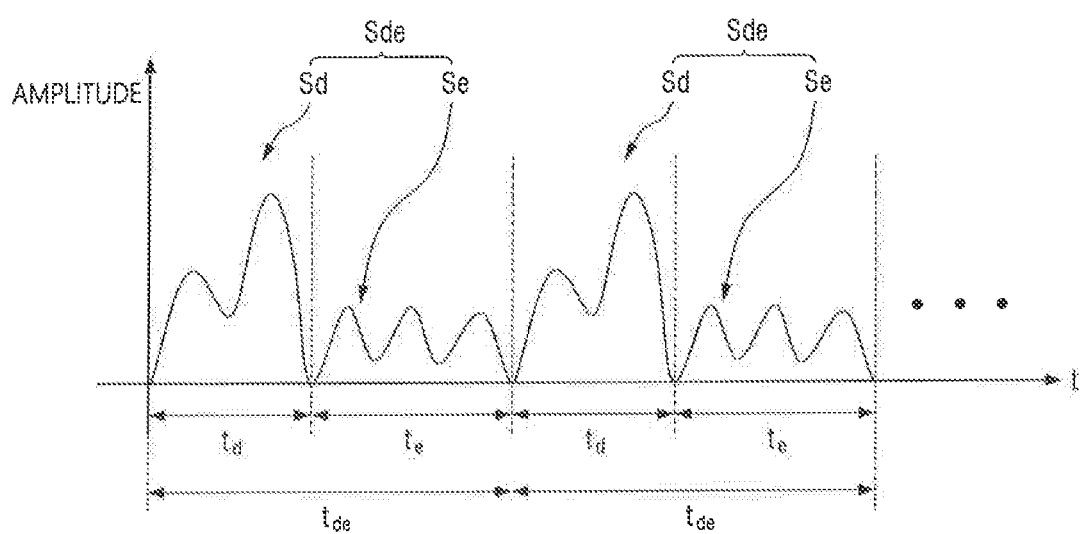
FIG. 24 is a graph showing a multi-pattern signal for multi-touch of a fourth touch and a fifth touch according to an exemplary embodiment of the inventive concept.

FIG. 23 is a graph showing a pattern signal for a third touch according to an exemplary embodiment of the inventive concept. FIG. 24 is a graph showing a multi-pattern signal for multi-touch of a fourth touch and a fifth touch according to an exemplary embodiment of the inventive concept.

Referring to FIGS. 22 and 23, the display device 10_5 may provide a third pattern signal Sc for the third touch C made on the first area LA to the first vibrating element 500_a.

The third pattern signal Sc may be a periodic signal having a period $t_c$, with varying amplitude. The third pattern signal Sc may be a signal generated in a manner similar to the first pattern signal Sa and the second pattern signal Sb described above with reference to FIGS. 18 and 19. When the third touch C is made in the first area LA, the first vibrating element 500_a may receive the third pattern signal Sc and may provide a third vibration for the third touch C to the user. The third pattern signal Sc may be transmitted only to the first vibrating element 500_a. In addition, the third pattern signal Sc may not be affected by a touch made on the second area RA.

Referring to FIGS. 22 and 24, the display device 10_5 may provide a third multi-pattern signal Sde for the fourth touch C and the fifth touch E made in the second area RA to the second vibrating element 500_b.

The third multi-pattern signal Sde may be a pattern signal for multi-touch of the fourth touch D and the fifth touch E made substantially simultaneously. The third multi-pattern signal Sde may be a periodic signal having a period $t_{de}$, with varying amplitude. The third multi-pattern signal Sde may be a pattern signal in which signals are provided at different periods of time, like the first multi-pattern signal Sab1 described above with reference to FIG. 20. For example, in the third multi-pattern signal Sde, a fourth pattern signal Sd for the fourth touch D and a fifth pattern signal Se for the fifth touch E may be provided alternately. The period $t_{de}$ of the third multi-pattern signal Sde may be equal to the sum of a period $t_d$ of the fourth pattern signal Sd and a period $t_e$ of the fifth pattern signal Se. For example, when the third multi-pattern signal Sde is transmitted to the second vibrating element 500_b, the second vibrating element 500_b may generate the fourth vibration by the fourth pattern signal Sd and the fifth vibration by the fifth pattern signal Se alternately.

When the third touch C, the fourth touch D, and the fifth touch E are made substantially simultaneously on the display device 10_5, the first vibrating element 500_a and the second vibrating element 500_b may be operated individually, as described above. The first vibrating element 500_a may receive the third pattern signal Sc in response to the third touch C and may provide the third vibration to the user. The second first vibrating element 500_b may receive the third multi-pattern signal Sde in which the fourth pattern signal Sd and the fifth pattern signal Se are provided at different periods of time in response to the fourth touch D and the fifth touch E, and may provide the fourth vibration and the fifth vibration alternately to the user.

Figure 25:
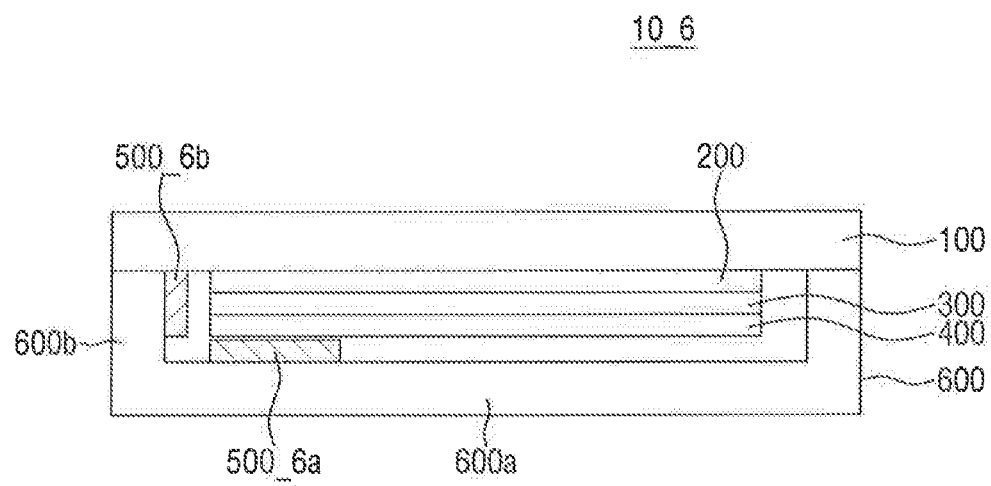
FIG. 25 is a cross-sectional view of a display device according to an exemplary embodiment of the inventive concept.

FIG. 25 is a cross-sectional view of a display device according to an exemplary embodiment of the inventive concept. The exemplary embodiment shown in FIG. 25 is different from the exemplary embodiment of FIG. 3 in that vibrating elements 500_6a and 500_6b are disposed neither on the display panel 300 nor on the cover panel sheet 400, but are disposed on the bracket 600. For convenience of illustration, descriptions will be made focusing on differences from the above-described exemplary embodiments and redundant descriptions will be omitted.

Referring to FIG. 25, a display device 10_6 may include vibrating elements 500_6a and 500_6b disposed on the bracket 600.

As shown in FIG. 25, the vibrating element 500_6a of the display device 10_6 may be disposed on a bottom surface 600a of the bracket 600. The vibrating element 500_6a disposed on the bottom surface 600a may face the lower surface of each of the touch member 200, the display panel 300, and the cover panel sheet 400. When the vibrating element 500_6a is disposed directly on the bottom surface 600a of the bracket 600, the vibration generated by the vibrating element 500_6a can be effectively transferred to the entire display device 10_6 through the bracket 600. In the exemplary embodiment of FIG. 3, the vibrating element is used as means for providing a user with feedback for a touch. In contrast, in the exemplary embodiment of FIG. 25, the vibrating element 500_6a may be used as means for notifying the user of an event by vibrating the display device 10_6.

In addition, the vibrating element 500_6b may be disposed on a side wall 600b of the bracket 600 rather than the bottom surface 600a of the bracket 600. The vibration element 500_6b disposed on the side wall 600b may face the side surface of each of the touch member 200, the display panel 300, and the cover panel sheet 400. When the vibrating element 500_6b is disposed on the side wall 600b of the bracket 600, the thickness of the display device 10_6 can be further reduced. Although FIG. 25 shows the plurality of vibrating elements 500_6a and 500_6b, this is merely illustrative. Only one of the vibrating elements 500_6a and 500_6b may be disposed in some implementations.

Additionally, when a plurality of vibrating elements is disposed, the vibrating elements may be disposed not only on the bottom surface 600a and/or the side wall 600b of the bracket 600 but also on different locations of the display panel 300. Such vibrating elements may be controlled individually. As such, a variety of haptic feedbacks can be transferred to the user.

Figure 26:
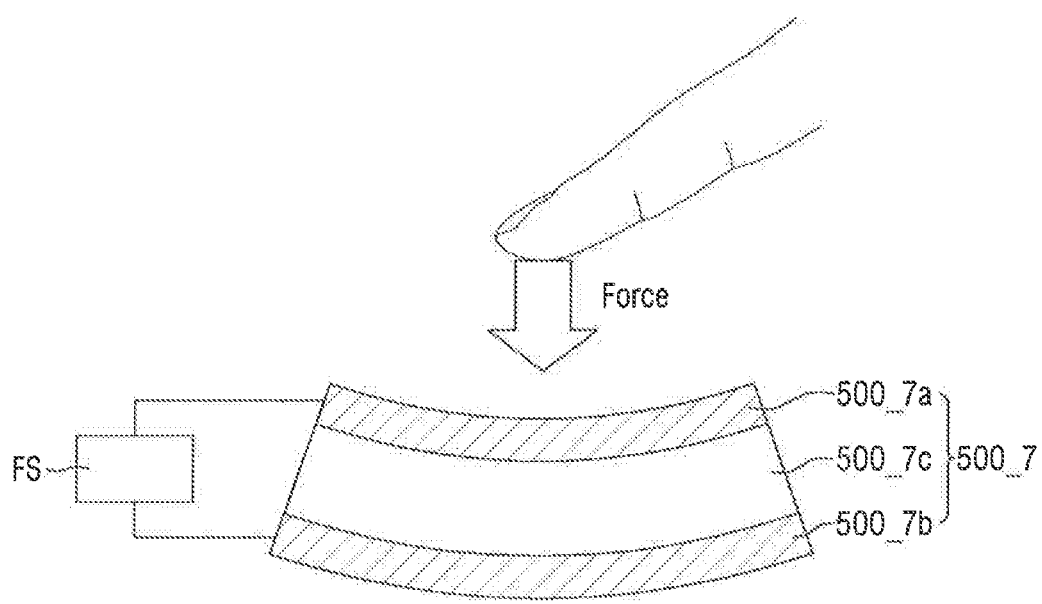
FIG. 26 is a view for conceptually illustrating operation characteristics when a vibrating element according to an exemplary embodiment of the inventive concept is used as a force sensor.

FIG. 26 is a view for conceptually illustrating operation characteristics when a vibrating element according to an exemplary embodiment of the inventive concept is used as a force sensor. In the above-described exemplary embodiments of the inventive concept, the vibrating elements generate vibrations to transfer haptic feedback to the user. In contrast, when a piezoelectric element is used as the vibrating element, a vibrating element 500_7 may also be utilized as a force sensor thanks to the physical properties of the piezoelectric element.

Referring to FIG. 26, a vibrating element 500_7 may include a first electrode 500_7a, a second electrode 500_7b, and a vibration material layer 500_7c disposed between the first electrode 500_7a and the second electrode 500_7b.

When a force is applied to the vibrating element 500_7, displacement may occur in the vibration material layer 500_7c. When the displacement occurs in the vibration material layer 500_7c, a voltage may be generated from the vibration material layer 500_7c. The display device may include a force sensor FS separately connected to the first electrode 500_7a and the second electrode 500_7b of the vibrating element 500_7.

The force sensor FS senses a voltage generated in the vibrating element 500_7 and may detect a change in force. In other words, when the force sensor FS senses the voltage generated in the vibrating element 500_7, it can be determined that displacement has occurred in the vibration material layer 500_7c. If it is determined that the vibration material layer 500_7c is pressed by external pressure such that the displacement has occurred, the force sensor FS may sense a force.

When the vibrating element 500_7 is used as a force sensor, the vibrating element 500_7 may be disposed in the display device separately from the vibrating elements for transferring haptic feedback. In exemplary embodiments of the inventive concept, however, a single vibrating element 500_7 may provide haptic feedback and also work as a force sensor. This can be achieved by operating the single vibrating element 500_7 as a driver for providing a haptic feedback and as a sensor for sensing a force at different periods of time.

As described above, exemplary embodiments of the inventive concept provide a display device that can transfer vibration more effectively, in which a vibrating element is included without further increasing the thickness.

Exemplary embodiments of the inventive concept also provide a display device that can transfer a variety of vibrations with a reduced number of vibrating elements.

According to an exemplary embodiment of the inventive concept, by way of incorporating a vibrating element into a cover panel sheet or forming it in a groove formed in the cover panel sheet, the vibrating element can be disposed without further increasing the thickness. In addition, by way of attaching the vibrating element directly to the display panel without a diaphragm, vibration can be transferred more effectively.

According to an exemplary embodiment of the inventive concept, by way of operating the vibrating element differently for different periods of time, a variety of vibrations can be transferred with a reduced number of vibrating elements.

While the inventive concept has been shown and described with reference to exemplary embodiments thereof, it is to be understood to those of ordinary skill in the art that various modifications in form and details may be made thereto without departing from the spirit and scope of the inventive concept as set forth by the following claims.

What is claimed is:

1. A display device comprising:
   a display panel;
   a touch member disposed on the display panel and configured to sense a touch signal;
   a cover panel sheet disposed under the display panel and having an opening via which at least a part of the display panel is exposed, wherein the cover panel sheet comprises a light-absorbing member disposed under the display panel;
   a first vibrating element disposed in the opening;
   a touch drive chip electrically connected to the touch member and configured to detect touch coordinates in response to the touch signal;
   a processor electrically connected to the touch drive chip and configured to receive the touch coordinates to generate a pattern signal corresponding to the touch coordinates; and
   a haptic drive chip electrically connected to the processor and configured to receive the pattern signal to control the first vibrating element,
   wherein the first vibrating element is operated differently for different periods of time.

2. The display device of claim 1, wherein the cover panel sheet comprises a buffer member disposed under the light-absorbing member, and wherein the first vibrating element overlaps with neither the light-absorbing member nor the buffer member.

3. The display device of claim 2, wherein the first vibrating element comprises a vibration material layer, and wherein the vibration material layer comprises at least one of a piezoelectric material, a piezoelectric film, or an electroactive polymer.

4. The display device of claim 3, further comprising: a bracket configured to accommodate the display panel, the touch member, and the cover panel sheet, wherein the bracket comprises a bracket trench or a bracket opening.

5. The display device of claim 1, wherein when a first touch comprising first touch coordinates is made on the touch member, the processor transmits a first pattern signal corresponding to the first touch coordinates to the haptic drive chip.

6. The display device of claim 5, wherein when a second touch comprising second touch coordinates is made on the touch member, the processor transmits a second pattern signal corresponding to the second touch coordinates to the haptic drive chip.

7. The display device of claim 6, wherein when the first touch and the second touch are substantially simultaneously made on the touch member, the processor transmits a first multi-pattern signal comprising the first pattern signal and the second pattern signal to the haptic drive chip.

8. The display device of claim 7, wherein the haptic drive chip controls the first vibrating element in response to the first multi-pattern signal,
wherein the first vibrating element is controlled to perform a first operation during a first period of time and a second operation during a second period of time,
wherein in the first operation, the first vibrating element provides a first vibration according to the first pattern signal,
wherein in the second operation, the first vibrating element provides a second vibration according to the second pattern signal, and
wherein the first vibrating element is controlled to repeat the first operation and the second operation alternately from a third period of time until a predetermined period of time.

9. The display device of claim 6, further comprising: a second vibrating element spaced apart from the first vibrating element, wherein the first vibrating element is controlled in accordance with the first pattern signal, and the second vibrating element is controlled in accordance with the second pattern signal.

10. The display device of claim 1, wherein the touch drive chip is electrically connected to the haptic drive chip, and determines whether or not the pattern signal corresponding to the touch coordinates is stored therein.

11. The display device of claim 10, wherein the touch drive chip transmits the pattern signal to the haptic drive chip when the pattern signal is stored in the touch drive chip, and wherein the touch drive chip transmits the touch coordinates to the processor when the pattern signal is not stored in the touch drive chip.

12. The display device of claim 1, further comprising: a force sensor electrically connected to the first vibrating element, wherein the force sensor is configured to measure a voltage generated by a force applied to the first vibrating element.

13. A display device comprising:
a display panel;
a touch member disposed on the display panel and configured to sense a touch signal;
a cover panel sheet disposed under the display panel and having a trench that is concave toward the display panel, wherein the cover panel sheet comprises a light-absorbing member disposed under the display panel;
a first vibrating element disposed in the trench;
a touch drive chip electrically connected to the touch member and configured to detect touch coordinates in response to the touch signal;
a processor electrically connected to the touch drive chip and configured to receive the touch coordinates to generate a pattern signal corresponding to the touch coordinates; and
a haptic drive chip electrically connected to the processor and configured to receive the pattern signal to control the first vibrating element,
wherein the first vibrating element is operated differently for different periods of time.

14. The display device of claim 13, wherein the cover panel sheet comprises a buffer member disposed under the light-absorbing member, and wherein the first vibrating element overlaps with the light-absorbing member but not with the buffer member.

15. The display device of claim 14, wherein the first vibrating element comprises a vibration material layer, and wherein the vibration material layer comprises at least one of a piezoelectric material, a piezoelectric film, or an electroactive polymer.

16. The display device of claim 15, further comprising: a bracket configured to accommodate the display panel, the touch member, and the cover panel sheet, wherein the bracket comprises a bracket trench or a bracket opening.

17. The display device of claim 13, wherein when a first touch comprising first touch coordinates and a second touch comprising second touch coordinates are made on the touch member, the processor transmits a first pattern signal corresponding to the first touch coordinates and a second pattern signal corresponding to the second touch coordinates to the haptic drive chip.

18. The display device of claim 17, wherein when the first touch and the second touch are made substantially simultaneously on the touch member, the processor transmits a first multi-pattern signal comprising the first pattern signal and the second pattern signal to the haptic drive chip,
wherein the haptic drive chip controls the first vibrating element in response to the first multi-pattern signal,
wherein the first vibrating element is controlled to perform a first operation during a first period of time and a second operation during a second period of time,
wherein in the first operation, the first vibrating element provides a first vibration according to the first pattern signal,
wherein in the second operation, the first vibrating element provides a second vibration according to the second pattern signal during a second period of time, and
wherein the first vibrating element is controlled to repeat the first operation and the second operation alternately from a third period of time until a predetermined period of time.

19. The display device of claim 13, wherein the touch drive chip is electrically connected to the haptic drive chip and configured to determine whether or not the pattern signal corresponding to the touch coordinates is stored therein, wherein the touch drive chip transmits the pattern signal to the haptic drive chip when the pattern signal is stored in the touch drive chip, and wherein the touch drive chip transmits the touch coordinates to the processor when the pattern signal is not stored in the touch drive chip.

20. A display device comprising:
a display panel;
a touch member disposed on the display panel and configured to sense a touch signal;
a cover panel sheet disposed under the display panel;
a bracket configured to accommodate the display panel, the touch member, and the cover panel sheet;
a vibrating element disposed in contact with the bracket;
a touch drive chip electrically connected to the touch member and configured to detect touch coordinates in response to the touch signal;
a processor electrically connected to the touch drive chip and configured to receive the touch coordinates to generate a pattern signal corresponding to the touch coordinates; and
a haptic drive chip electrically connected to the processor and configured to receive the pattern signal to control the vibrating element,
wherein the vibrating element is operated differently for different periods of time,
wherein the touch drive chip is configured to determine whether or not the pattern signal corresponding to the touch coordinates is stored therein.

* * * * *